United States Patent
Graif et al.

(10) Patent No.: US 12,164,460 B2
(45) Date of Patent: Dec. 10, 2024

(54) PROVIDING ACKNOWLEDGEMENTS FOR SYSTEM POWER MANAGEMENT INTERFACE

(71) Applicant: QUALCOMM Incorporated, San Diego, CA (US)

(72) Inventors: Sharon Graif, Zichron Yaakov (IL); Navdeep Mer, Bangalore (IN); Naveen Kumar Narala, Bengaluru (IN); Sriharsha Chakka, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 99 days.

(21) Appl. No.: 17/923,110

(22) PCT Filed: Apr. 16, 2021

(86) PCT No.: PCT/US2021/027717
§ 371 (c)(1),
(2) Date: Nov. 3, 2022

(87) PCT Pub. No.: WO2021/247152
PCT Pub. Date: Dec. 9, 2021

(65) Prior Publication Data
US 2023/0350841 A1 Nov. 2, 2023

(30) Foreign Application Priority Data
Jun. 3, 2020 (IN) .............................. 202041023318

(51) Int. Cl.
*G06F 13/42* (2006.01)
*G06F 13/40* (2006.01)

(52) U.S. Cl.
CPC ...... *G06F 13/4291* (2013.01); *G06F 13/4072* (2013.01)

(58) Field of Classification Search
CPC .................. G06F 13/4291; G06F 13/4072
See application file for complete search history.

(56) References Cited

U.S. PATENT DOCUMENTS 10,725,949 B2 * 7/2020 Graif ..................... G06F 1/3293
11,169,944 B2 * 11/2021 Takahashi ........... G06F 13/4291
(Continued)

OTHER PUBLICATIONS

Anonymous: "The I2C Specification 2.1", Philips Semiconductors, Jan. 1, 2000, (Jan. 1, 2000), XP030001520, ISSN: 0000-0097, pp. 1-46.
(Continued)

*Primary Examiner* — Henry Tsai
*Assistant Examiner* — Christopher A Daley
(74) *Attorney, Agent, or Firm* — Loza & Loza, LLP

(57) ABSTRACT

Systems, methods, and apparatus are configured to enable a receiver to provide feedback. In one example, a method performed at a device coupled to a serial bus includes receiving a write command from the serial bus in a datagram, writing a data byte received in a first data frame of the datagram to a register address identified by the datagram, and using a second data frame of the datagram to provide feedback regarding the datagram. Feedback may be provided by driving a data line of the serial bus to provide a negative acknowledgement during the second data frame when a transmission error is detected in the datagram, and refraining from driving the data line of the serial bus during the second data frame when no transmission error is detected in the datagram, thereby providing an acknowledgement of the datagram.

24 Claims, 15 Drawing Sheets

(56) References Cited

U.S. PATENT DOCUMENTS

| | | | |
|---|---|---|---|
| 11,334,512 B1* | 5/2022 | Tripathy | ................. G06F 21/81 |
| 2005/0080944 A1 | 4/2005 | Tomitsuka et al. | |
| 2018/0189221 A1* | 7/2018 | Morning-Smith | ........................... |
| | | | G06F 13/4282 |
| 2019/0163649 A1 | 5/2019 | Mishra et al. | |
| 2020/0042750 A1* | 2/2020 | Chun | ..................... G06F 21/81 |
| 2020/0073847 A1* | 3/2020 | Mishra | ................. G06F 13/102 |

OTHER PUBLICATIONS

International Search Report and Written Opinion—PCT/US2021/027717—ISA/EPO—Aug. 18, 2021.

* cited by examiner

SPMI Register 0 Write

| SPMI Bus Arb. | SSC | Slave Address | Command Code | P | BP |
|---|---|---|---|---|---|
| 18 cycles | 1 0 | SA[3:0] | Data[6:0] 1 | P | BP |

1000 → 1002 (SPMI Bus Arb.), 1004 (SSC), 1006 (Slave Address / SA[3:0]), 1008 (Command Code / Data[6:0]), 1010 (P / BP), 1012

Register-0 Format

| Bit-6 | Bit-5 | Bit-4 | Bit-3 | Bit-2 | Bit-1 | Bit-0 |
|---|---|---|---|---|---|---|
| Reserved | Reserved | Reserved | EN_S4 | EN_S3 | EN_S2 | EN_S1 |

PROVIDING ACKNOWLEDGEMENTS FOR SYSTEM POWER MANAGEMENT INTERFACE

PRIORITY

This application is the U.S. national stage of PCT patent application number PCT/US2021/027717 filed on Apr. 16, 2021, which claims priority to and the benefit of patent application Ser. No. 20/204,1023318 filed in the Indian Patent Office on Jun. 3, 2020, the entire content of these applications being incorporated herein by reference as if fully set forth below in its entirety and for all applicable purposes.

TECHNICAL FIELD

The present disclosure relates generally to serial communication over a shared serial bus and, more particularly, to providing feedback on a shared bus.

BACKGROUND

Mobile communication devices may include a variety of components including circuit boards, integrated circuit (IC) devices and/or System-on-Chip (SoC) devices. The components may include processing devices, user interface components, storage and other peripheral components that communicate through a shared data communication bus, which may include a multi-drop serial bus or a parallel bus. General-purpose serial interfaces known in the industry include the Inter-Integrated Circuit (I2C or I2C) serial interface and its derivatives and alternatives.

The Mobile Industry Processor Interface (MIPI) Alliance defines standards for the Improved Inter-Integrated Circuit (I3C) serial interface, the Radio Frequency Front-End (RFFE) interface, the System Power Management Interface (SPMI) and other interfaces. These interfaces may be used to connect processors, sensors and other peripherals, for example, through a multi-drop serial bus. In some interfaces, multiple bus masters are coupled to the serial bus such that two or more devices can serve as bus master for different types of messages transmitted on the serial bus. SPMI protocols define a hardware interface that may be implemented between baseband or application processors and peripheral components. In some instances, SPMI protocols are implemented to support power management operations within a device.

A multi-drop serial bus may be capable of supporting large numbers of devices that implement increasingly higher-speed, more complex applications, and new protocols are being developed to support such advanced applications. There is need to support legacy devices when new protocols are implemented.

SUMMARY

Certain aspects of the disclosure relate to systems, apparatus, methods and techniques that can enable devices coupled to a serial bus to provide feedback that includes acknowledgement of transmissions over the serial bus. According to certain aspects, existing bus protocols can be leveraged to implement a feedback mechanism while providing for coexistence with conventional slave devices. The bus may be operated in accordance with an SPMI protocol, or another protocol usable on a serial bus.

In various aspects of the disclosure, a method performed at a device coupled to a serial bus includes receiving a write command from the serial bus, where the write command is received in a datagram and configured in accordance with an SPMI protocol, writing a data byte received in a first data frame of the datagram to a register address identified by the datagram, and using a second data frame of the datagram to provide feedback regarding the datagram. Feedback may be provided by driving a data line of the serial bus to provide a negative acknowledgement during the second data frame when a transmission error is detected in the datagram, and refraining from driving the data line of the serial bus during the second data frame when no transmission error is detected in the datagram, thereby providing an acknowledgement of the datagram.

In various aspects of the disclosure, an apparatus includes an interface circuit adapted to couple the apparatus to a serial bus, and a processor. The processor may be configured to receive a write command from the serial bus, where the write command is received in a datagram and configured in accordance with an SPMI protocol, write a data byte received in a first data frame of the datagram to a register address identified by the datagram, and use a second data frame of the datagram to provide feedback regarding the datagram, by driving a data line of the serial bus to provide a negative acknowledgement during the second data frame when a transmission error is detected in the datagram, and refraining from driving the data line of the serial bus during the second data frame when no transmission error is detected in the datagram, thereby providing an acknowledgement of the datagram.

In various aspects of the disclosure, a processor-readable storage medium stores code for receiving a write command from the serial bus, where the write command is received in a datagram and configured in accordance with an SPMI protocol, writing a data byte received in a first data frame of the datagram to a register address identified by the datagram, and using a second data frame of the datagram to provide feedback regarding the datagram. Feedback may be provided by driving a data line of the serial bus to provide a negative acknowledgement during the second data frame when a transmission error is detected in the datagram, and refraining from driving the data line of the serial bus during the second data frame when no transmission error is detected in the datagram, thereby providing an acknowledgement of the datagram.

In various aspects of the disclosure, an apparatus includes means for receiving a write command from the serial bus, where the write command is received in a datagram and configured in accordance with an SPMI protocol, means for writing a data byte received in a first data frame of the datagram to a register address identified by the datagram, and means for using a second data frame of the datagram to provide feedback regarding the datagram. Feedback may be provided by driving a data line of the serial bus to provide a negative acknowledgement during the second data frame when a transmission error is detected in the datagram, and refraining from driving the data line of the serial bus during the second data frame when no transmission error is detected in the datagram, thereby providing an acknowledgement of the datagram.

In various aspects of the disclosure, a method performed at a transmitting device coupled to a serial bus includes transmitting a write command over the serial bus in a datagram that is configured in accordance with an SPMI protocol, transmitting a data byte in a first data frame of the datagram, providing a bus park sequence on the serial bus in a second data frame of the datagram, and receiving feedback regarding the datagram during the second data frame and after providing the bus park sequence. The feedback may include a feedback bit of the second data frame that indicates a negative acknowledgement when received as a first value, and may indicate an acknowledgement of the datagram when received as a second value.

In various aspects of the disclosure, an apparatus includes an interface circuit adapted to couple the apparatus to a serial bus, and a processor. The processor may be configured to transmit a write command over the serial bus in a datagram that is configured in accordance with an SPMI protocol, transmit a data byte in a first data frame of the datagram, provide a bus park sequence on the serial bus in a second data frame of the datagram, and receive feedback regarding the datagram during the second data frame and after providing the bus park sequence. The feedback may include a feedback bit of the second data frame that indicates a negative acknowledgement when received as a first value, and indicates an acknowledgement of the datagram when received as a second value.

In various aspects of the disclosure, a processor-readable storage medium stores code for transmitting a write command over the serial bus in a datagram that is configured in accordance with an SPMI protocol, transmitting a data byte in a first data frame of the datagram, providing a bus park sequence on the serial bus in a second data frame of the datagram, and receiving feedback regarding the datagram during the second data frame and after providing the bus park sequence. The feedback may include a feedback bit of the second data frame that indicates a negative acknowledgement when received as a first value, and may indicate an acknowledgement of the datagram when received as a second value.

In various aspects of the disclosure, an apparatus includes means for transmitting a write command over the serial bus in a datagram that is configured in accordance with an SPMI protocol, means for transmitting a data byte in a first data frame of the datagram, providing a bus park sequence on the serial bus in a second data frame of the datagram, and means for receiving feedback regarding the datagram during the second data frame and after providing the bus park sequence. The feedback may include a feedback bit of the second data frame that indicates a negative acknowledgement when received as a first value, and may indicate an acknowledgement of the datagram when received as a second value.

BRIEF DESCRIPTION OF THE DRAWINGS

FIG. 10 illustrates a datagram structure for an SPMI Register-0 Writ command in accordance with certain aspects disclosed herein.

DETAILED DESCRIPTION

Figure 1:
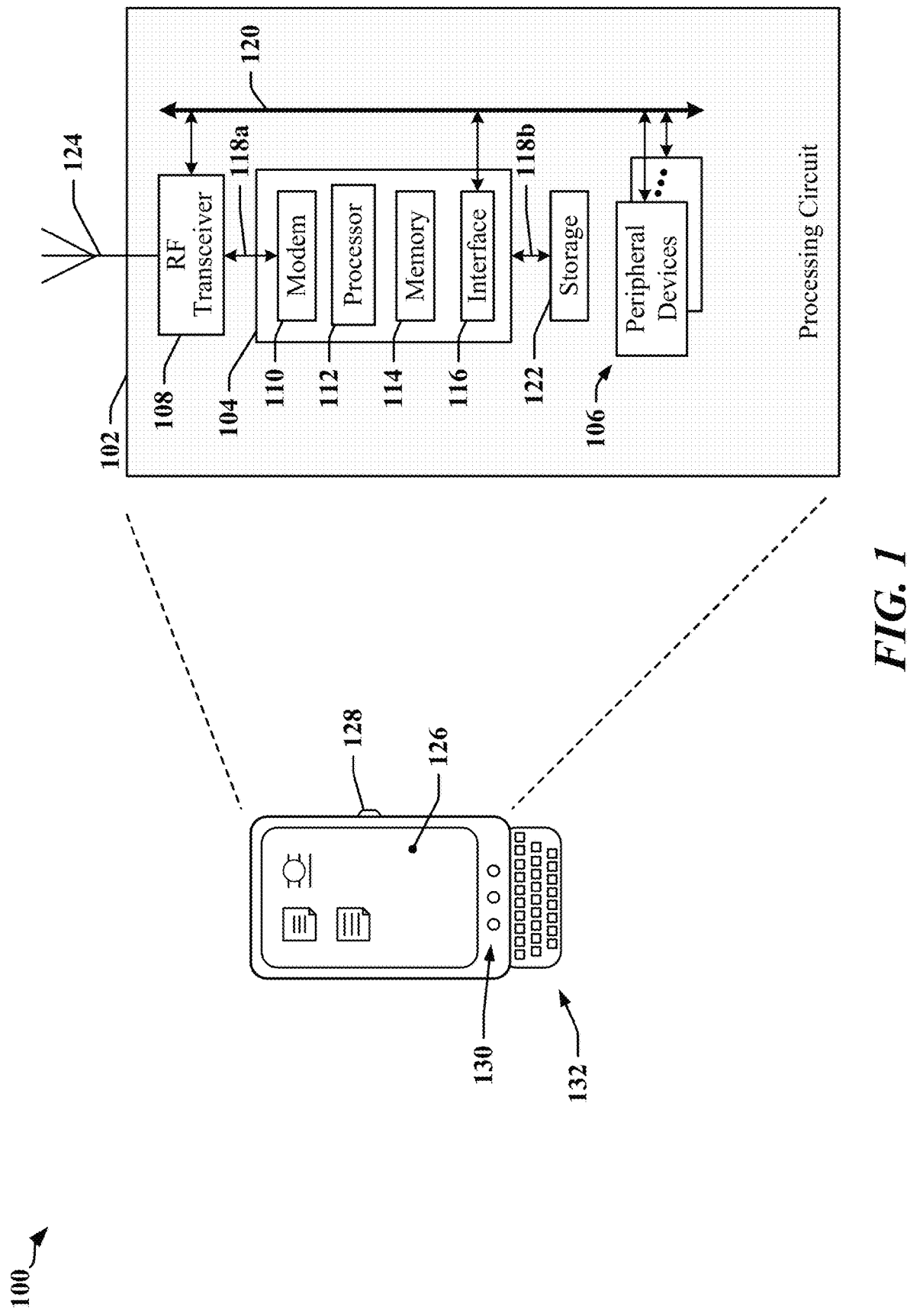
FIG. 1 illustrates an apparatus employing a data link between IC devices that is selectively operated according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Overview

Devices that include SoC and other IC devices often employ a shared communication interface that may include a serial bus or other data communication link to connect different devices. In one example, a multi-drop serial bus may be implemented to interconnect processors with modems and other peripherals. The serial bus and other data communication link may be operated in accordance with multiple standards or protocols defined. For example, the serial bus may be operated in accordance with an I2C, I3C, SPMI, and/or RFFE protocol, or another protocol that may be configured for half-duplex operation. Increased functionality and complexity of operations involving devices coupled to serial buses, together with the use of greater numbers of peripherals, radio-frequency front-end devices and/or sensors device in support of complex applications requires updates to existing bus protocols that include new features that were undefined in earlier versions of the bus protocols.

Certain aspects of the disclosure relate to the provision of feedback capability for devices configured to provide feedback in accordance with one version of the SPMI specification when such devices are coupled to a serial bus operated in accordance with a different version of the SPMI specification that does not support feedback.

In one example, an apparatus includes an interface circuit adapted to couple the apparatus to a serial bus, and a processor. The processor may be configured to receive a write command from the serial bus, where the write command is received in a datagram and configured in accordance with an SPMI protocol, write a data byte received in a first data frame of the datagram to a register address identified by the datagram, and use a second data frame of the datagram to provide feedback regarding the datagram, by driving a data line of the serial bus to provide a negative acknowledgement during the second data frame when a transmission error is detected in the datagram, and refraining from driving the data line of the serial bus during the second data frame when no transmission error is detected in the datagram, thereby providing an acknowledgement of the datagram.

Certain aspects disclosed herein are described with reference to a serial bus operated in accordance with SPMI protocols. However, certain concepts may be equally applicable to RFFE protocols, I3C protocols, I2C protocols, and/or or another bus protocol. Certain aspects are applicable to a serial bus operated in half-duplex mode or full-duplex mode. Certain aspects are applicable to multipoint interfaces and/or interfaces operated in point-to-point mode.

Examples Of Apparatus That Employ Serial Data Links

According to certain aspects, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, or any other similar functioning device.

FIG. 1 illustrates an example of an apparatus 100 that may employ a data communication bus. The apparatus 100 may include a processing circuit 102 having multiple circuits or devices 104, 106 and/or 108, which may be implemented in one or more ASIC devices or in a System-on-chip (SoC) device. In one example, the apparatus 100 may be configured for use as a communication device and the processing circuit 102 may include a processing device provided in an ASIC 104, one or more peripheral devices 106, and a transceiver 108 that enables the apparatus to communicate through an antenna 124 with a radio access network, a core access network, the Internet and/or another network.

The ASIC 104 may have one or more processors 112, one or more modems 110, on-board memory 114, a bus interface circuit 116 and/or other logic circuits or functions. The processing circuit 102 may be controlled by an operating system that provides an application programming interface (API) layer that enables the one or more processors 112 to execute software modules residing in the on-board memory 114 or other processor-readable storage 122 provided on the processing circuit 102. The software modules may include instructions and data stored in the on-board memory 114 or processor-readable storage 122. The ASIC 104 may access its on-board memory 114, the processor-readable storage 122, and/or storage external to the processing circuit 102. The on-board memory 114, the processor-readable storage 122 may include read-only memory (ROM) or random-access memory (RAM), electrically erasable programmable ROM (EEPROM), flash cards, or any memory device that can be used in processing systems and computing platforms. The processing circuit 102 may include, implement, or have access to a local database or other parameter storage that can maintain operational parameters and other information used to configure and operate the apparatus 100 and/or the processing circuit 102. The local database may be implemented using registers, a database module, flash memory, magnetic media, EEPROM, soft or hard disk, or the like. The processing circuit 102 may also be operably coupled to external devices such as the antenna 124, a display 126, operator controls, such as switches or buttons 128, 130 and/or an integrated or external keypad 132, among other components. A user interface module may be configured to operate with the display 126, external keypad 132, etc. through a dedicated communication link or through one or more serial data interconnects.

The processing circuit 102 may include or be coupled to one or more buses 118a, 118b, 120 that enable certain devices 104, 106, and/or 108 to exchange messages and other information. In one example, the ASIC 104 may have a bus interface circuit 116 that includes a combination of circuits, counters, timers, control logic and other configurable circuits or modules. In one example, the bus interface circuit 116 may be configured to operate in accordance with communication specifications or protocols. The processing circuit 102 may include or control a power management function that configures and manages the operation of the apparatus 100.

Figure 2:
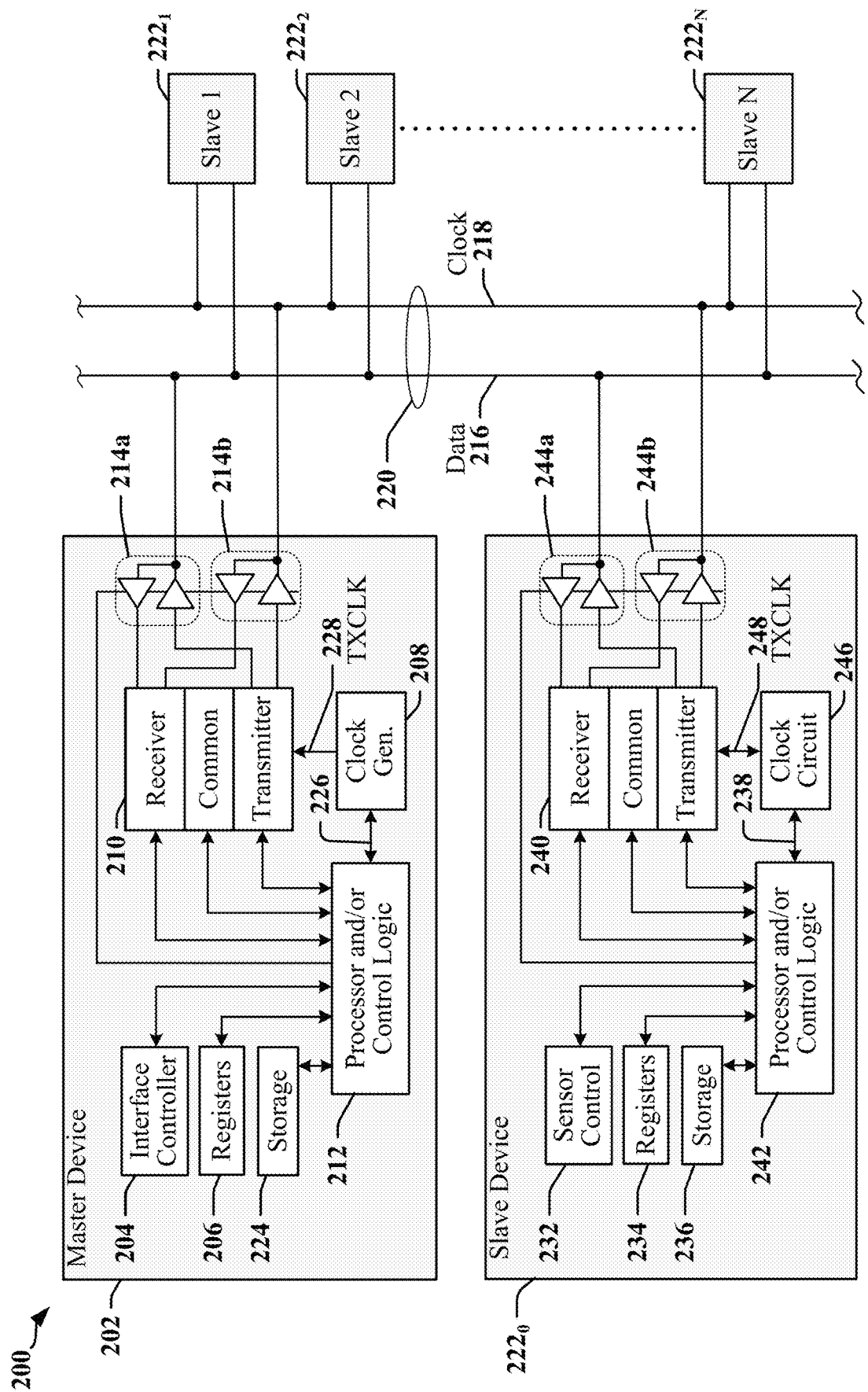
FIG. 2 illustrates a system architecture for an apparatus employing a data link between IC devices.

FIG. 2 illustrates certain aspects of an apparatus 200 that includes multiple devices 202, and $222_0$-$222_N$ coupled to a serial bus 220. The devices 202 and $222_0$-$222_N$ may be implemented in one or more semiconductor IC devices, such as an application processor, SoC or ASIC. In various implementations the devices 202 and $222_0$-$222_N$ may include, support or operate as a modem, a signal processing device, a display driver, a camera, a user interface, a sensor, a sensor controller, a media player, a transceiver, RFFE devices, and/or other such components or devices. In some examples, one or more of the slave devices $222_0$-$222_N$ may be used to control, manage or monitor a sensor device. Communication between devices 202 and $222_0$-$222_N$ over the serial bus 220 is controlled by a bus master 202. Certain types of bus can support multiple bus masters 202.

In one example, a master device 202 may include an interface controller 204 that manages access to the serial bus, configures dynamic addresses for slave devices $222_0$-$222_N$ and/or causes a clock signal 228 to be transmitted on a clock line 218 of the serial bus 220. The master device 202 may include configuration registers 206 or other storage 224, and other control logic 212 configured to handle protocols and/or higher level functions. The control logic 212 may include a processing circuit such as a state machine, sequencer, signal processor or general-purpose processor. The master device 202 includes a transceiver 210 and line drivers/receivers 214a and 214b. The transceiver 210 may include receiver, transmitter and common circuits, where the common circuits may include timing, logic and storage circuits and/or devices. In one example, the transmitter encodes and transmits data based on timing in the clock signal 228 provided by a clock generation circuit 208. Other timing clocks 226 may be used by the control logic 212 and other functions, circuits or modules.

At least one device $222_0$-$222_N$ may be configured to operate as a slave device on the serial bus 220 and may include circuits and modules that support a display, an image sensor, and/or circuits and modules that control and communicate with one or more sensors that measure environmental conditions. In one example, a slave device $222_0$ configured to operate as a slave device may provide a control function, module or circuit 232 that includes circuits and modules to support a display, an image sensor, and/or circuits and modules that control and communicate with one or more sensors that measure environmental conditions. The slave device $222_0$ may include configuration registers 234 or other storage 236, control logic 242, a transceiver 240 and line drivers/receivers 244a and 244b. The control logic 242 may include a processing circuit such as a state machine, sequencer, signal processor or general-purpose processor. The transceiver 210 may include receiver, transmitter and common circuits, where the common circuits may include timing, logic and storage circuits and/or devices. In one example, the transmitter encodes and transmits data based on timing in a clock signal 248 provided by clock generation and/or recovery circuits 246. The clock signal 248 may be derived from a signal received from the clock line 218. Other timing clock signals 238 may be used by the control logic 242 and other functions, circuits or modules.

The serial bus 220 may be operated in accordance with an I2C, I3C, RFFE, SPMI, C-PHY, D-PHY protocol or another suitable protocol. At least one device 202, $222_0$-$222_N$ may be configured to selectively operate as either a master device or a slave device on the serial bus 220. Two or more devices 202, $222_0$-$222_N$ may be configurable to operate as a master device on the serial bus 220.

In one example, the serial bus 220 may be operated in accordance with an I3C protocol. Devices that communicate using the I3C protocol can coexist on the same serial bus 220 with devices that communicate using I2C protocols. The I3C protocols may support different communication modes, including a single data rate (SDR) mode that is compatible with I2C protocols. High-data-rate (HDR) modes may provide a data transfer rate between 6 megabits per second (Mbps) and 16 Mbps, and some HDR modes may be provide higher data transfer rates. I2C protocols may conform to de facto I2C standards providing for data rates that may range between 100 kilobits per second (kbps) and 3.2 Mbps. I2C and I3C protocols may define electrical and timing aspects for signals transmitted on the 2-wire serial bus 220, in addition to data formats and aspects of bus control. In some aspects, the I2C and I3C protocols may define direct current (DC) characteristics affecting certain signal levels associated with the serial bus 220, and/or alternating current (AC) characteristics affecting certain timing aspects of signals transmitted on the serial bus 220. In some examples, a 2-wire serial bus 220 transmits data on a data line 216 and a clock signal on the clock line 218. In some instances, data may be encoded in the signaling state, or transitions in signaling state of the data line 216 and the clock line 218.

In some conventional systems, multiple serial buses are provided to support demands for high data throughput, low latency, high bus availability and/or for other reasons. In some instances, multiple serial buses are used to alleviate issues cause by limited addressing capabilities of serial bus protocols. By way of example, FIGS. 3 and 4 illustrate systems in which multiple serial buses may be employed to interconnect master and slave devices.

Figure 3:
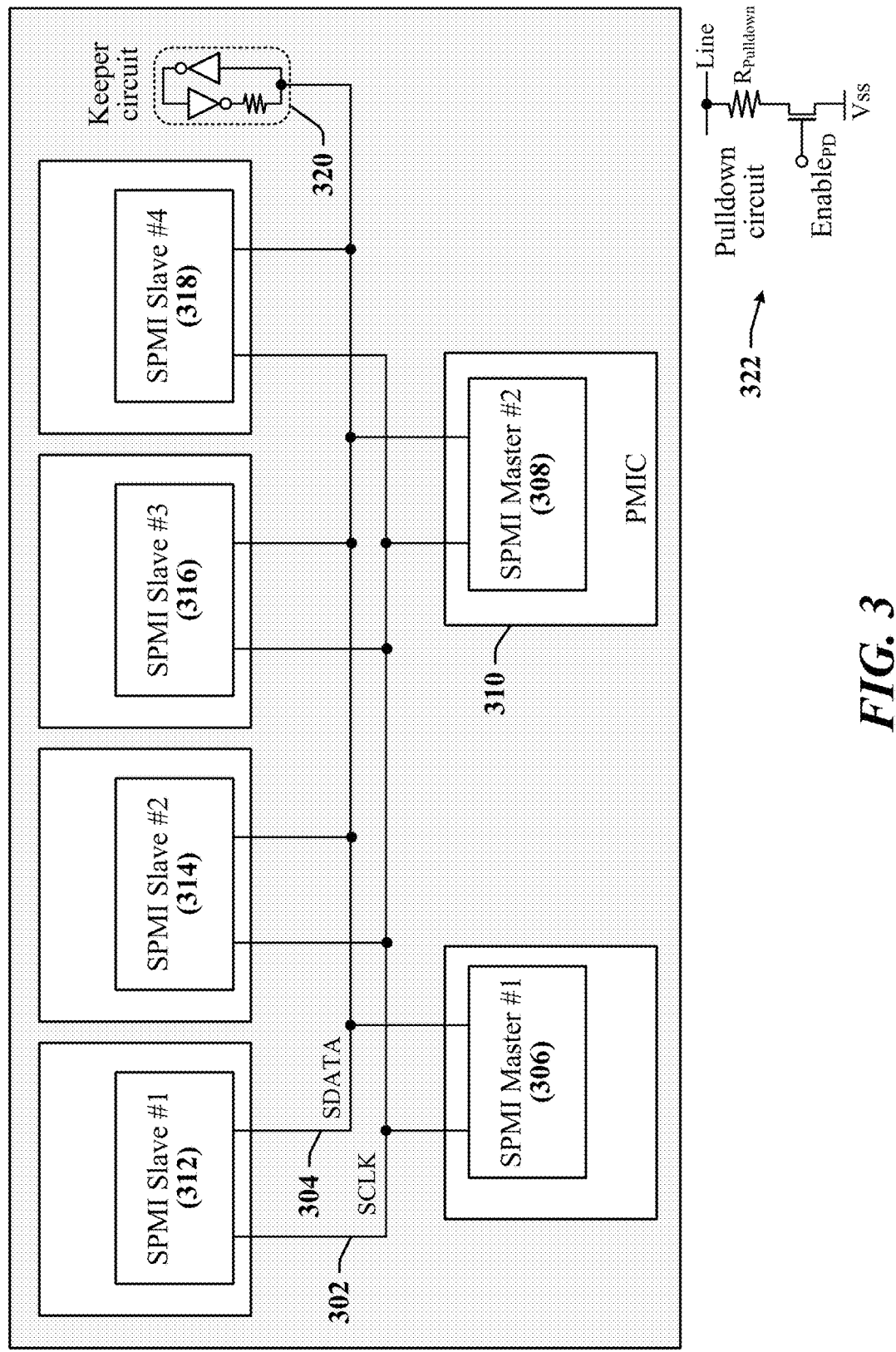
FIG. 3 illustrates a device that employs an SPMI bus to couple various devices in accordance with certain aspects disclosed herein.
Figure 4:
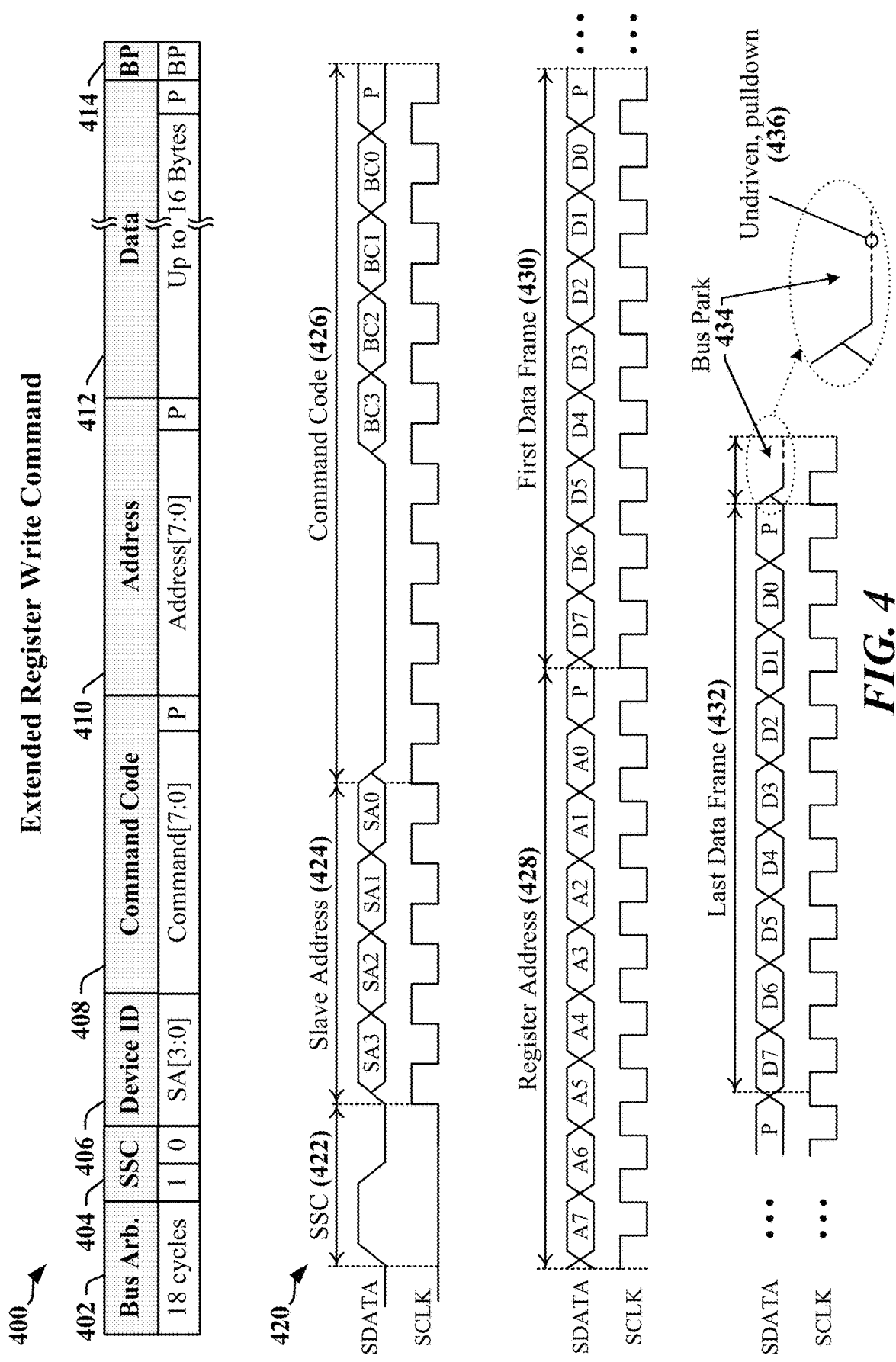
FIG. 4 illustrates a datagram structure and timing diagram for an SPMI Extended Register Write command.

FIG. 3 illustrates an example of a system 300 that includes a serial bus that may be operated in accordance with an SPMI, or another bus protocol. In some implementations, SPMI protocols are used for power management control and the bus may be configured to support communication of commands used to cause circuits or functional components to reset, sleep, shutdown, wakeup, and so on. In some implementations, SPMI bus protocols may be used to implement a general-purpose communication link. In the illustrated example, a two-wire serial bus includes a first wire (SCLK 302) that carries a clock signal and a second wire (SDATA 304) that carries a data signal transmitted in accordance with timing provided by the clock signal. The serial bus may connect multiple slave devices, including application processors, modems, sensors, controllers etc. that can be configured to serve as a master device. For example, a power management integrated circuit (PMIC 310) may be coupled to a serial bus that is operated in accordance with an SPMI protocol.

Devices may be coupled to the serial bus as a slave or master. In the example of a serial bus operated in accordance with an SPMI protocol, between one and four master devices 306, 308 and up to 16 slave devices 312, 314, 316, 318 may be coupled to the serial bus. SPMI protocols, support bus contention arbitration, request arbitration and group addressing. Slave devices 312, 314, 316, 318 coupled to the serial bus devices may be required to acknowledge certain commands. A Bus Arbitration sequence is performed before transactions to allocate control of the serial bus to one master or to one slave when multiple devices are requesting access to the serial bus in order to send a command sequence. A request for access to the serial bus can be made when the bus is idle by driving SDATA 304 to a high signaling state while SCLK 302 is in a low signaling state. Certain slave devices are capable of requesting access to the serial bus.

During certain operations, SCLK 302 and/or SDATA 304 may be undriven and may be held in a signaling state by keeper circuit 320, or by a pulldown circuit 322. In one example, a keeper circuit 320 may be configured as a positive feedback circuit that drives SDATA 304 through a high impedance output, and receives feedback from SDATA 304 through a low impedance input. The keeper circuit 320 may be configured to maintain the last asserted voltage on SDATA 304. The keeper circuit 320 can be easily overcome by a line driver in a master device 306, 308 or a slave device 312, 314, 316, 318. In some instances, a pulldown circuit 322 (or pull-up circuit) may be used to maintain SCLK 302 and/or SDATA 304 in a desired signaling state. The illustrated pulldown circuit 322 can be activated to couple a pulldown resistor to a line of the serial bus.

Protocols that support communication over a multi-drop serial bus may define a datagram structure used to transmit command, control and data payloads within application-defined latency tolerances. Datagram structures for different protocols define certain common features, including addressing used to select devices to receive or transmit data, clock generation and management, interrupt processing and device priorities. In this disclosure, the example of SPMI protocols is employed to illustrate certain aspects of the disclosure. However, the concepts disclosed herein are applicable to other serial bus protocols and standards.

FIG. 4 illustrates a datagram 400 and a corresponding timing diagram 420 for an Extended Register Write (ERW) command that may be transmitted over a serial bus. The datagram 400 may be transmitted by a device that wins bus arbitration during an arbitration sequence 402. The datagram 400 commences with a two-bit sequence start condition (SSC 404, 422) followed by a four-bit slave address 406, 424 or other device identifier. An 8-bit command code 408, 426 is provided with a parity bit. The command code 408 426 includes a byte count (BC[3:0]) that indicates the number of bytes to be written. The command code 408, 426 is followed by an 8-bit register address 410, 428 and between one and sixteen frames of data 412. The data may include at least a first data frame 430. After transmission of a final data frame 432, bus park signaling 414, 434 is provided. The bus park signaling 414, 434 is provided when the slave device initially drives SDATA low and then releases SDATA to an undriven state 436, in which SDATA is held low by a keeper circuit, a pulldown circuit/resistance.

Figure 5:
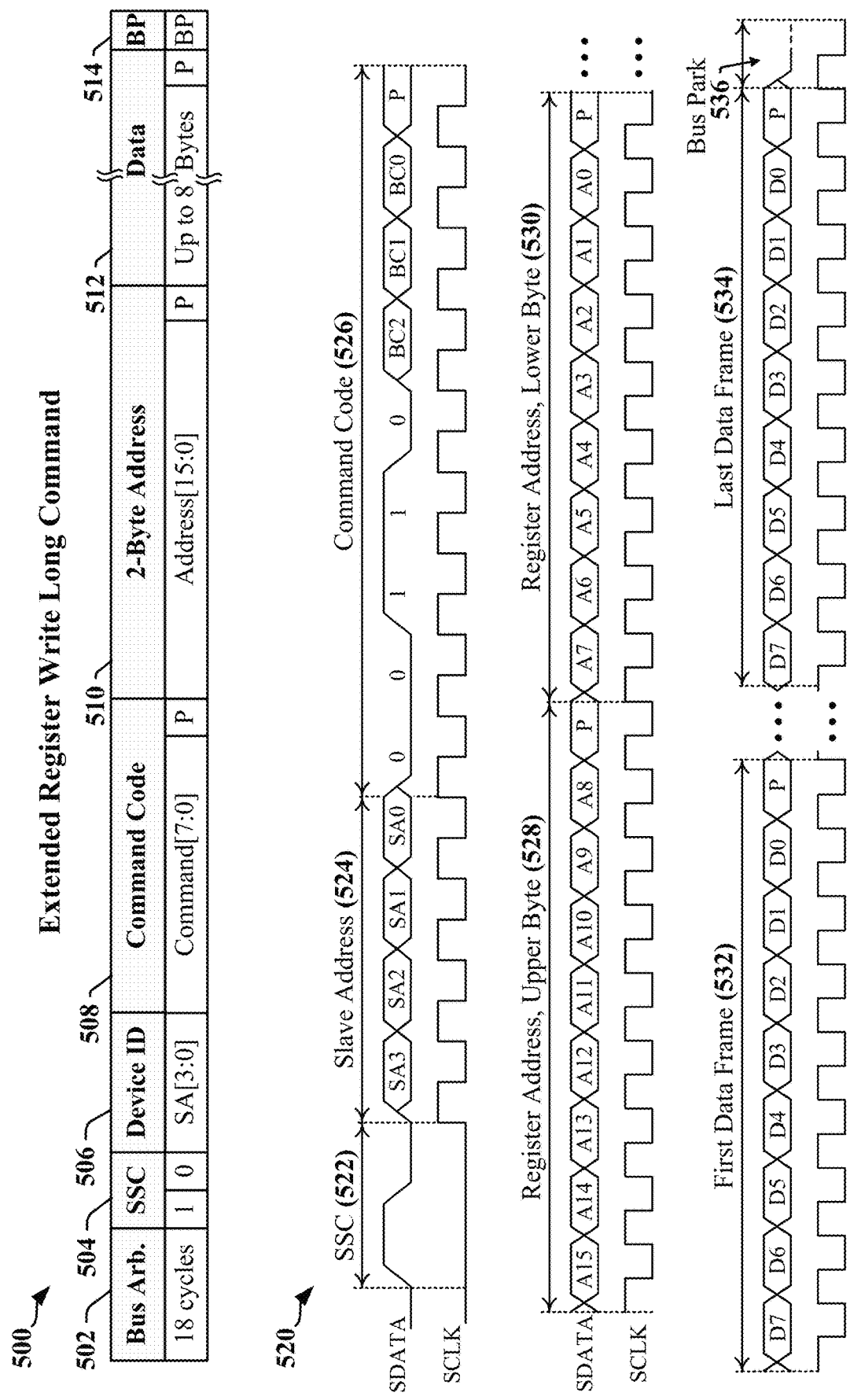
FIG. 5 illustrates a datagram structure and timing diagram for an SPMI Extended Register Write Long command.

FIG. 5 illustrates a datagram 500 and a corresponding timing diagram 520 for an Extended Register Write Long (ERWL) command that may be transmitted over a serial bus. The datagram 500 may be transmitted by a device that wins bus arbitration during an arbitration sequence 502. The datagram 500 commences with transmission of a two-bit sequence start condition (SSC 504, 522) followed by a four-bit slave address 506, 524 or other device identifier. An 8-bit command code 508, 526 is provided with a parity bit. The command code 508, 526 incudes a byte count (BC[2:0]) that indicates the number of bytes to be written. The command code 508, 526 is followed by a 16-bit register address 510. The 16-bit register address 510 may include an upper address byte 528 and a lower address byte 530. Between one and eight frames of data 512 may be transmitted in the datagram 500. The data 512 may include at least a first data frame 532. After transmission of a final data frame 534, bus park signaling 514, 536 is transmitted.

Certain versions of SPMI specifications (which may be identified as SPMI 1. x herein) do not include all of the features defined for later versions of the SPMI specifications (which may be identified as SPMI 2. x herein). In one example, an acknowledgement feature defined for SPMI 2. x is not available for use on a device operating in accordance with SPMI 1. x. In some SPMI 2. x implementations, an acknowledge/not acknowledge (ACK/NACK) bit may be transmitted at the end of a datagram, after first bus park signaling 414, 434, 514, 536 and may be followed by second bus park signaling. When a Command Sequence that provides for an ACK/NACK bit is addressed to a single device using a unique slave identifier (USID) or a master identifier (MID), the addressed device may be configured to respond with an ACK/NACK bit value of 'b1 if the command sequence was received correctly. The addressed device may be configured to respond with an ACK/NACK bit value of 'b0 if the command sequence was received correctly. When a Command Sequence that provides for an ACK/NACK bit is addressed to a group of slave devices using a group slave identifier (GSID), an addressed device may be configured to maintain its line driver for SDATA in a high-impedance state if the command sequence was received correctly and a slave device may be configured to respond with an ACK/NACK value of 'b1 only if an error was detected in the command sequence. On a serial bus operated in accordance with SPMI protocols, SDATA is typically pulled low when all devices are in a high-impedance state.

Certain aspects of this disclosure relate to techniques that leverage existing bus protocols to expand the ability of devices to provide and receive feedback on data transmitted over a serial bus. In some examples, feedback includes an acknowledgement (ACK) that a command sequence that includes one or more data bytes has been received without apparent error. In some examples, feedback includes a negative acknowledgement (NACK) indicating an error associated with the reception of the command sequence. In some implementations, feedback can be enabled and supported when existing bus protocols do not provide a feedback mechanism by providing a dummy data byte and manipulating the byte count in the command sequence to ensure that a sufficient number of clock pulses are provided to accommodate transmission of the dummy data byte.

Certain aspects of this disclosure relate to a feedback mechanism that can be used when devices compliant with SPMI 2. x are configured for use on a serial operated in accordance the SPMI 1. x. In one aspect, the feedback mechanism does not impact the functionality of legacy devices, such as a PMIC 310 (see FIG. 3) that supports SPMI 1. x. In one example, a device that is compliant with SPMI 2. x and configured according to certain aspects of this disclosure may support a feedback mechanism implemented using dummy data bytes and ERW and ERWL command sequences when operating on a serial bus in accordance with SPMI 1. x bus where ACK/NACK cycle is not available.

Figure 6:
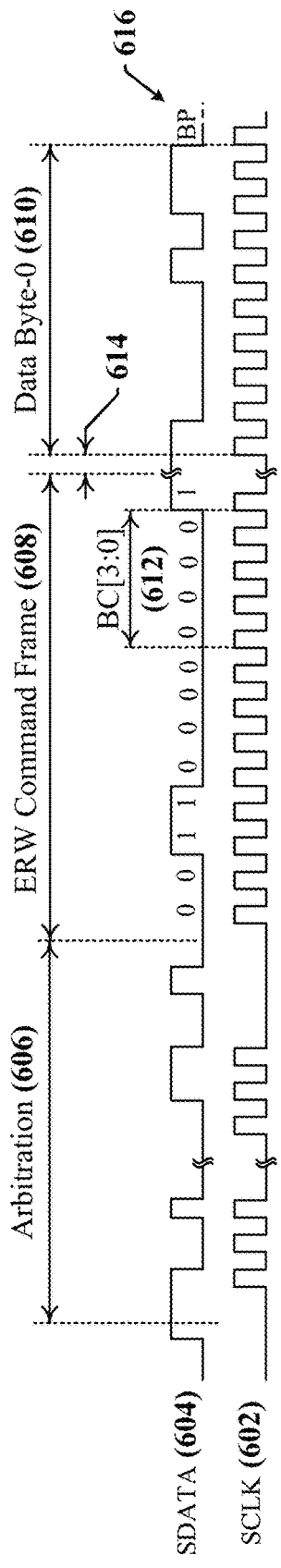
FIG. 6 illustrates a first transaction that supports acknowledgements using an SPMI Extended Register Write command configured in accordance with certain aspects disclosed herein.
Figure 6:
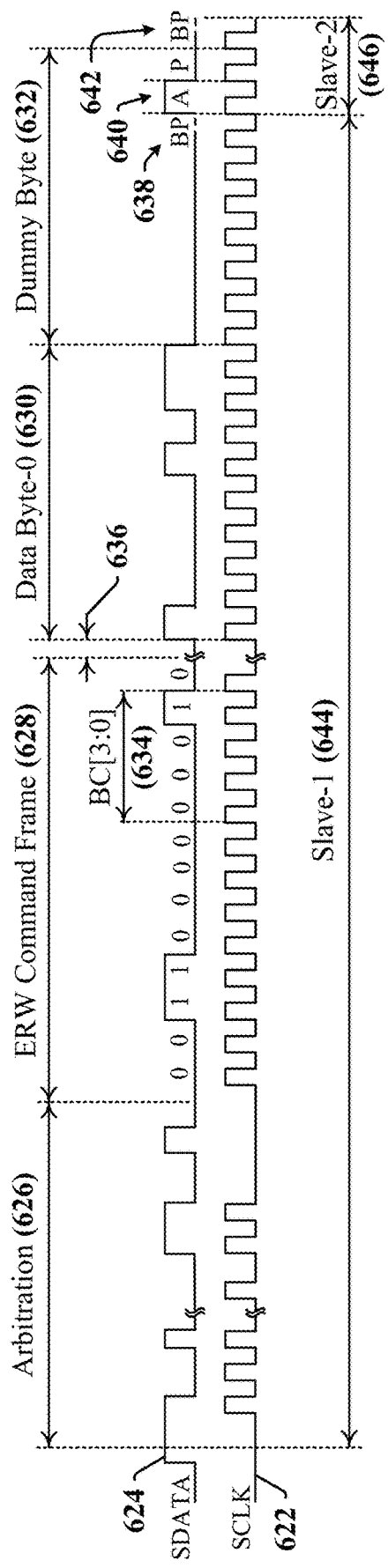

FIG. 6 illustrates a first transaction that supports acknowledgements in accordance with certain aspects disclosed herein. In this example, acknowledgements are supported using an ERW command. A first timing diagram 600 illustrates certain portions of a conventional datagram that includes an ERW command frame 608 transmitted using SCLK 602 and SDATA 604, and a second timing diagram 620 illustrates certain portions of a datagram that includes an ERW command frame 628 that has been configured in accordance with certain aspects disclosed herein.

According to certain aspects of the disclosure, feedback is provided in a datagram using a dummy data byte provided after the last valid data byte. A conventional device may be configured to ignore the dummy data byte. In both timing diagrams 600, 620, bus arbitration 606, 626 precedes transmission of the ERW command frame 608, 628. The device that wins bus arbitration 606, 626 transmits the ERW command frame 608, 628, which includes a target slave identifier, and the ERW command code. In the first timing diagram 600, the ERW command code includes a byte count 612 (BC[3:0]) that is set to '0' indicating that one byte is to be written. The ERW command frame 608 is followed by an 8-bit register address (shown as a compressed period 614) followed by a single data byte 610. Bus park signaling 616 indicates the end of the datagram.

In the second timing diagram 620, the ERW command code includes a byte count 634 (BC[3:0]) that is set to '1' indicating to the transmitter that two data bytes are being transmitted, causing the transmitter to provide sufficient clock pulses for transmitting two bytes. A conventional receiving device may be configured to ignore the last data byte. A device that is configured to provide feedback, may be further configured in accordance with certain aspects of this disclosure to provide the feedback within the data frame corresponding to the dummy data byte 632.

Continuing with the second timing diagram 620, an 8-bit register address (shown as a compressed section 636) is transmitted after the ERW command frame 628, followed by a data byte 630 for writing to the identified register address. The transmitter drives SDATA 624 to the low signaling state until the seventh clock pulse transmitted on SCLK 622 for the dummy data byte 632, at which point the transmitter provides bus park signaling 638, releasing SDATA 624 and causing its SDATA line driver to enter a high-impedance state. The receiving device can then provide feedback in the form of an ACK/NACK bit 640 during the eighth clock pulse transmitted on SCLK 622 for the dummy data byte 632. When the ERW command frame 628 is addressed to a MID or USID, a receiving device may drive SDATA 624 to the high signaling state to acknowledge successful receipt of the datagram and may leave SDATA 624 in the low signaling state when an error has been detected in the preceding data. When the ERW command frame 628 is addressed to a GSID, a receiving device may maintain its SDATA line driver in a high-impedance state when the datagram is successfully received and may drive SDATA 624 to the high signaling state to indicate an error has been detected in the datagram. SDATA 624 may be returned to the low signaling state during the ninth pulse transmitted on SCLK 622 for the dummy data byte 632, where the ninth pulse corresponds to a dummy parity bit. Bus park signaling 638 is then provided by releasing SDATA 624 and causing SDATA line drivers to enter a high-impedance state.

In the second timing diagram 620, the device that wins bus arbitration 606, 626 drives SDATA 624 for the duration of a transaction (Slave-1 644), commencing with the transmission of the ERW command frame 628 and continuing until the first bus park signaling 638. The winning device may handover control of SDATA 624 by providing the first bus park signaling 638. One or more devices targeted by the ERW command frame 628 may actively drive SDATA 624 for a period 646 that begins during or after the first bus park signaling 638 and ends with second bus park signaling 642 upon completion of transmission of the dummy data byte 632.

Figure 7:
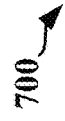
FIG. 7 illustrates a second transaction that supports acknowledgements using an SPMI Extended Register Write Long command that has been configured in accordance with certain aspects disclosed herein.
Figure 7:
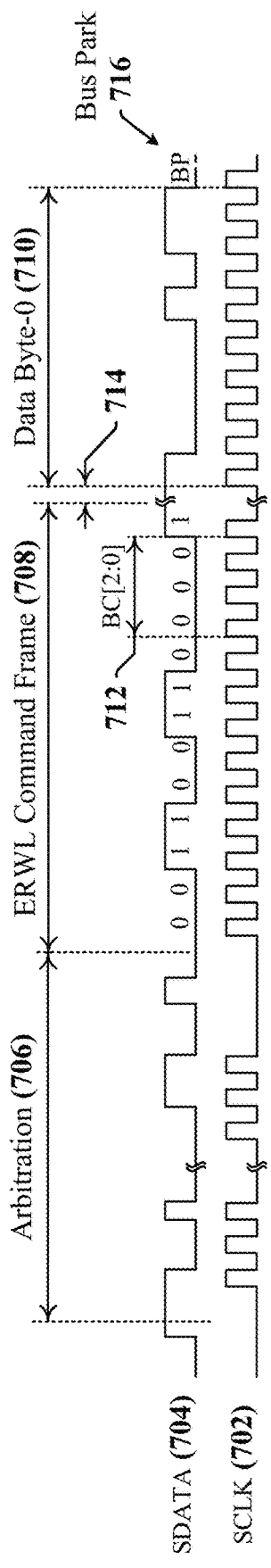
Figure 7:
Figure 7:
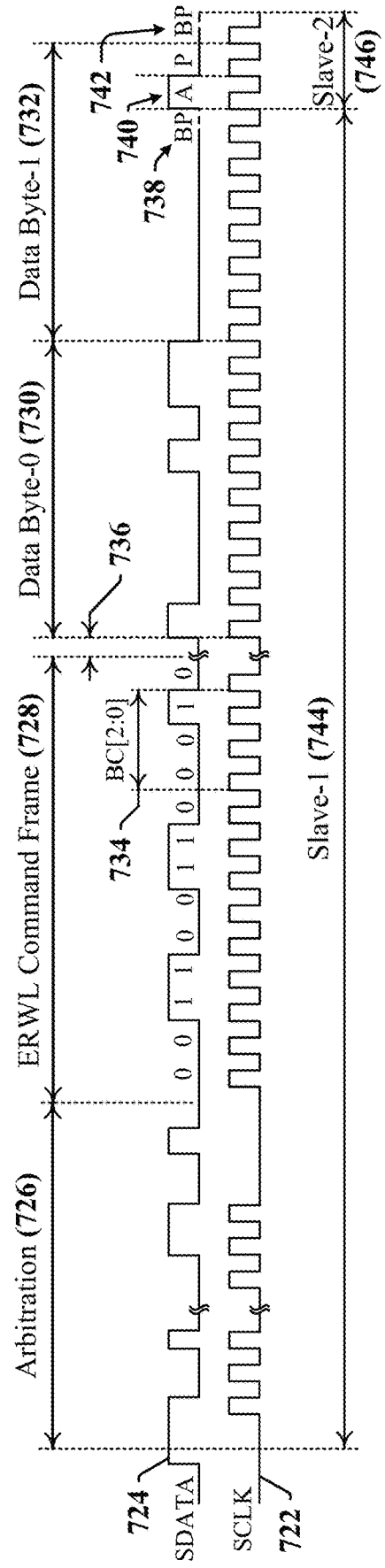

FIG. 7 illustrates a second transaction that supports acknowledgements in accordance with certain aspects disclosed herein. In this example, acknowledgements are supported using an ERWL command. A first timing diagram 700 illustrates certain portions of a conventional datagram that includes an ERWL command frame 708 transmitted using SCLK 702 and SDATA 704, and a second timing diagram 720 illustrates certain portions of a datagram that includes an ERWL command frame 728 that has been configured in accordance with certain aspects disclosed herein.

According to certain aspects of the disclosure, feedback is provided in a datagram using a dummy data byte transmitted after the last valid data byte. A conventional device may be configured to ignore the dummy data byte. In both timing diagrams 700, 720, bus arbitration 706, 726 precedes transmission of the ERWL command frame 708, 728. The device that wins bus arbitration 706, 726 transmits the ERWL command frame 708, 728, which includes a target slave identifier, and the ERWL command code. In the first timing diagram 700, the ERWL command code includes a byte count 712 (BC[2:0]) that is set to '0' indicating that one byte is to be written. The ERWL command frame 708 is followed by an 8-bit register address (shown as a compressed period 714) followed by a single data byte 710. Bus park signaling 716 indicates the end of the datagram.

In the second timing diagram 720, the ERWL command code includes a byte count 734 (BC[2:0]) that is set to '1' indicating to the transmitter that two data bytes are being transmitted, causing the transmitter to provide sufficient clock pulses for transmitting two bytes. A conventional receiving device may be configured to ignore the last data byte. A device that is configured to provide feedback, may be further configured in accordance with certain aspects of this disclosure to provide the feedback within the data frame corresponding to the dummy data byte 732.

Continuing with the second timing diagram 720, after the ERWL command frame 728 an 8-bit register address (shown as a compressed period 736) is transmitted, followed by a data byte 730 for writing to the identified register address. The transmitter drives SDATA 724 to the low signaling state until the seventh clock pulse transmitted on SCLK 722 for the dummy data byte 732, at which point the transmitter provides bus park signaling 738 by releasing SDATA 724 and causing its SDATA line driver to enter a high-impedance state. The receiving device can then provide feedback in the form of an ACK/NACK bit 740 during the eighth clock pulse transmitted on SCLK 722 for the dummy data byte 732.

When the ERWL command frame 728 is addressed to a MID or USID, a receiving device may drive SDATA 724 to the high signaling state to acknowledge successful receipt of the datagram, and may leave SDATA 724 in the low signaling state when an error has been detected in the preceding data. When the ERWL command frame 728 is addressed to a GSID, a receiving device may maintain its SDATA line driver in a high-impedance state when the datagram is successfully received and may drive SDATA 724 to the high signaling state to indicate an error has been detected in the datagram. SDATA 724 may be returned to the low signaling state during the ninth pulse transmitted on SCLK 722 for the dummy data byte 732, where the ninth pulse corresponds to a dummy parity bit. Bus park signaling 738 is then provided by releasing SDATA 724 and causing SDATA line drivers to enter a high-impedance state.

In the second timing diagram 720, the device that wins bus arbitration 706, 726 drives SDATA 724 for the duration of the transaction (Slave-1 744), commencing with the transmission of the ERWL command frame 728 and continuing until the first bus park signaling 738. The winning device may handover control of SDATA 724 by providing the first bus park signaling 738. One or more devices targeted by the ERWL command frame 728 may actively drive SDATA 724 for a period 746 that begins during or after the first bus park signaling 738 and ends with second bus park signaling 742 upon completion of transmission of the dummy data byte 732 when a negative acknowledgement is to be sent.

Figure 8:
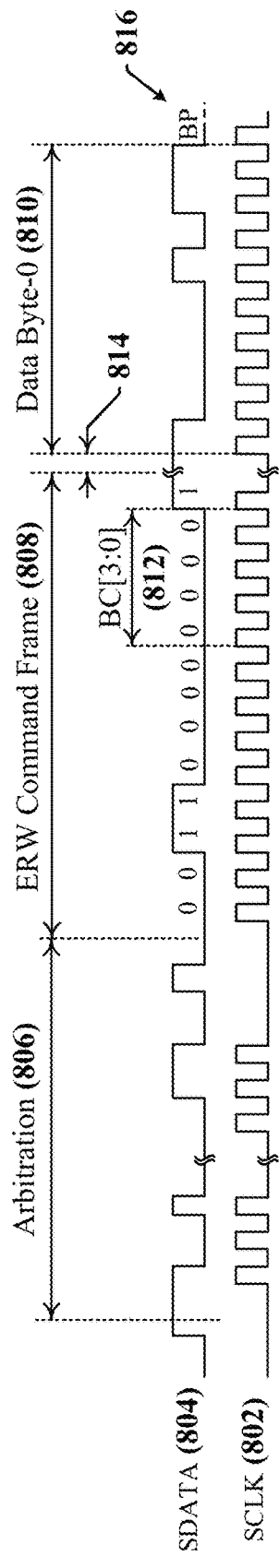
FIG. 8 illustrates a third transaction that supports acknowledgements using an SPMI Extended Register Write command that has been configured in accordance with certain aspects disclosed herein.
Figure 8:
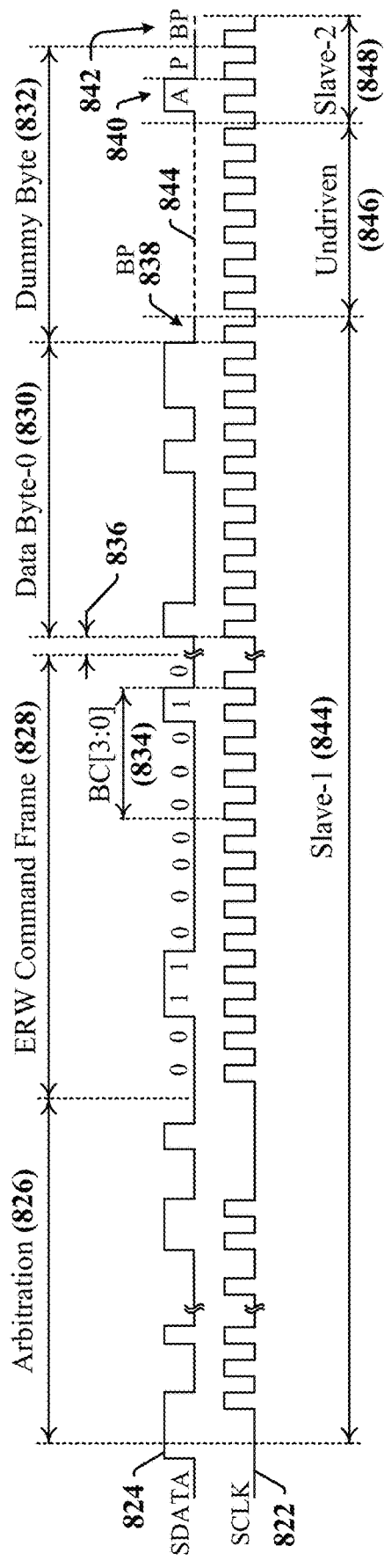

FIG. 8 illustrates a third transaction that supports acknowledgements in accordance with certain aspects disclosed herein. In this example, acknowledgements are supported using an ERW command. A first timing diagram 800 illustrates certain portions of a conventional datagram that includes an ERW command frame 808 transmitted using SCLK 802 and SDATA 804, and a second timing diagram 820 illustrates certain portions of a datagram that includes an ERW command frame 828 that has been configured in accordance with certain aspects disclosed herein.

According to certain aspects of the disclosure, feedback is provided in a datagram using a dummy data byte provided after the last valid data byte. A conventional device may be configured to ignore the dummy data byte. In both timing diagrams 800, 820, bus arbitration 806, 826 precedes transmission of the ERW command frame 808, 828. The device that wins bus arbitration 806, 826 transmits the ERW command frame 808, 828, which includes a target slave identifier, and the ERW command code. In the first timing diagram 800, the ERW command code includes a byte count 812 (BC[3:0]) that is set to '0' indicating that one byte is to be written. The ERW command frame 808 is followed by an 8-bit register address (shown as a compressed period 814) followed by a single data byte 810. Bus park signaling 816 indicates the end of the datagram.

In the second timing diagram 820, the ERW command code includes a byte count 834 (BC[3:0]) that is set to '1' indicating to the transmitter that two data bytes are being transmitted, causing the transmitter to provide sufficient clock pulses for transmitting two bytes. A conventional receiving device may be configured to ignore the last data byte. A device that is configured to provide feedback, may be further configured in accordance with certain aspects of this disclosure to provide the feedback within the data frame corresponding to the dummy data byte 832.

Continuing with the second timing diagram 820, an 8-bit register address (shown as a compressed section 836) is transmitted after the ERW command frame 828, followed by a data byte 830 for writing to the identified register address. In this example, early bus park signaling 838 is provided. The transmitter drives SDATA 824 to the low signaling state after the last bit of the parity bit of the data byte 830 has been transmitted, during the first clock pulse transmitted on SCLK 822 for the dummy data byte 832. The transmitter provides the bus park signaling 838 by releasing SDATA 824 and causing its SDATA line driver to enter a high-impedance state. SDATA 824 can remain in an undriven state 846, being held low by a keeper circuit or a pull-down circuit. The receiving device can provide feedback in the form of an ACK/NACK bit 840 during the eighth clock pulse transmitted on SCLK 822 for the dummy data byte 832.

The receiving device may activate its driver at any point after the bus park signaling 838. In one example, a receiving device that expects a slow line turnaround may activate its driver during the sixth clock pulse transmitted on SCLK 822 for the dummy data byte 832. In another example, a receiving device that expects a quick line turnaround may activate its driver during the seventh clock pulse transmitted on SCLK 822 for the dummy data byte 832.

When the ERW command frame 828 is addressed to a MID or USID, a receiving device may drive SDATA 824 to the high signaling state to acknowledge successful receipt of the datagram, and may leave SDATA 824 in the low signaling state when an error has been detected in the preceding data. When the ERW command frame 828 is addressed to a GSID, a receiving device may maintain its SDATA line driver in a high-impedance state when the datagram is successfully received and may drive SDATA 824 to the high signaling state to indicate an error has been detected in the datagram. SDATA 824 may be returned to the low signaling state during the ninth pulse transmitted on SCLK 822 for the dummy data byte 832, where the ninth pulse corresponds to a dummy parity bit. Bus park signaling 838 is then provided by releasing SDATA 824 and causing SDATA line drivers to enter a high-impedance state.

In the second timing diagram 820, the device that wins bus arbitration 806, 826 drives SDATA 824 for the duration of the transaction (Slave-1 844), commencing with the transmission of the ERW command frame 828 and continuing until the first bus park signaling 838. The winning device may handover control of SDATA 824 by providing the first bus park signaling 838. One or more devices targeted by the ERW command frame 828 may actively drive SDATA 824 for a period 848 that begins during or after the first bus park signaling 838 and that may end with second bus park signaling 842 upon completion of transmission of the dummy data byte 832.

Figure 9:
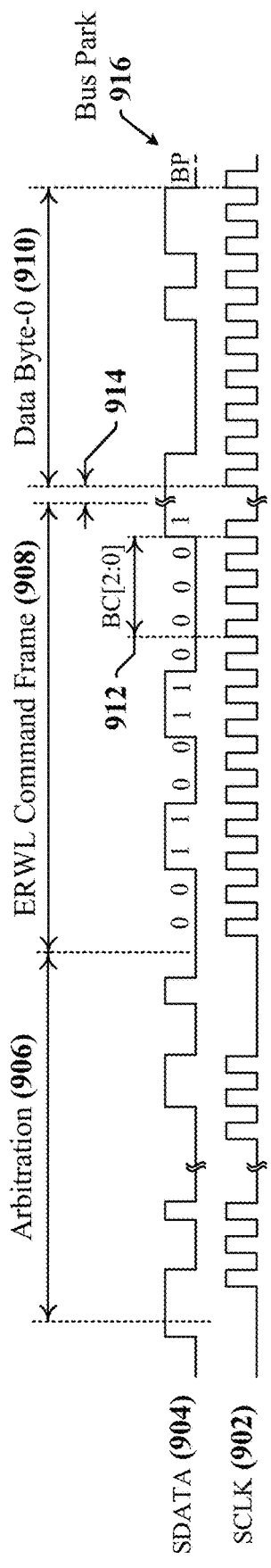
FIG. 9 illustrates a fourth transaction that supports acknowledgements using an SPMI Extended Register Write Long command that has been configured in accordance with certain aspects disclosed herein.
Figure 9:
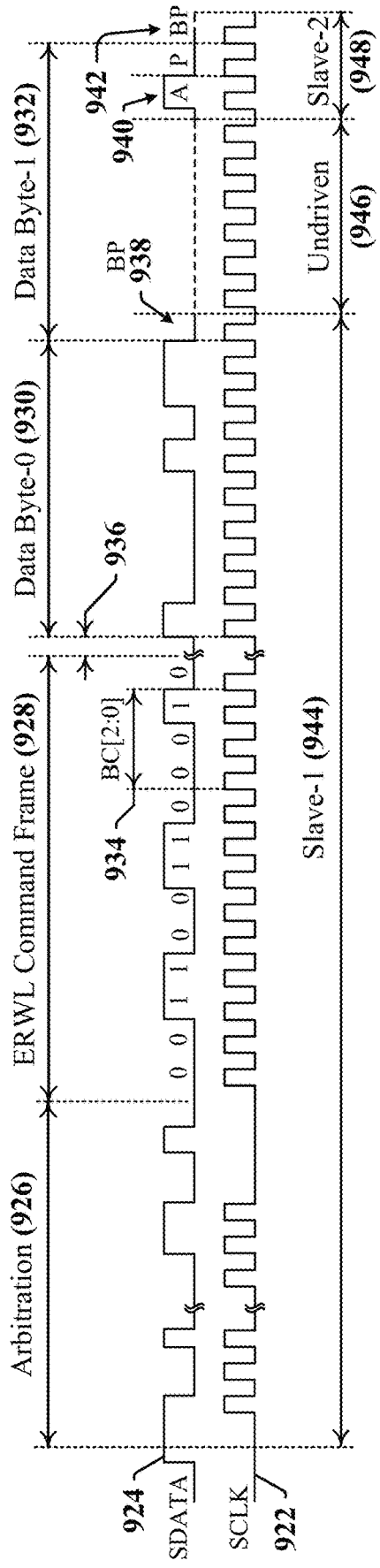

FIG. 9 illustrates a fourth transaction that supports acknowledgements in accordance with certain aspects disclosed herein. In this example, acknowledgements are supported using an ERWL command. A first timing diagram 900 illustrates certain portions of a conventional datagram that includes an ERWL command frame 908 transmitted using SCLK 902 and SDATA 904, and a second timing diagram 920 illustrates certain portions of a datagram that includes an ERWL command frame 928 that has been configured in accordance with certain aspects disclosed herein.

According to certain aspects of the disclosure, feedback is provided in a datagram using a dummy data byte transmitted after the last valid data byte. A conventional device may be configured to ignore the dummy data byte. In both timing diagrams 900, 920, bus arbitration 906, 926 precedes transmission of the ERWL command frame 908, 928. The device that wins bus arbitration 906, 926 transmits the ERWL command frame 908, 928, which includes a target slave identifier, and the ERWL command code. In the first timing diagram 900, the ERWL command code includes a byte count 912 (BC[2:0]) that is set to '0' indicating that one byte is to be written. The ERWL command frame 908 is followed by an 8-bit register address (shown as a compressed period 914) followed by a single data byte 910. Bus park signaling 916 indicates the end of the datagram.

In the second timing diagram 920, the ERWL command code includes a byte count 934 (BC[2:0]) that is set to '1' indicating to the transmitter that two data bytes are being transmitted, causing the transmitter to provide sufficient clock pulses for transmitting two bytes. A conventional receiving device may be configured to ignore the last data byte. A device that is configured to provide feedback, may be further configured in accordance with certain aspects of this disclosure to provide the feedback within the data frame corresponding to the dummy data byte 932.

Continuing with the second timing diagram 920, after the ERWL command frame 928 an 8-bit register address (shown as a compressed period 936) is transmitted, followed by a data byte 930 for writing to the identified register address. The transmitter drives SDATA 924 to the low signaling state after the last bit of the parity bit of the data byte 930 has been transmitted, during the first clock pulse transmitted on SCLK 922 for the dummy data byte 932. The transmitter provides bus park signaling 938 by releasing SDATA 924 and by causing its SDATA line driver to enter a high-impedance state. SDATA 924 can remain in an undriven state 946, being held low by a keeper circuit or a pull-down circuit. The receiving device can provide feedback in the form of an ACK/NACK bit 940 during the eighth clock pulse transmitted on SCLK 922 for the dummy data byte 932.

The receiving device may activate its driver at any point after the bus park signaling 938. In one example, a receiving device that expects a slow line turnaround may activate its driver during the sixth clock pulse transmitted on SCLK 922 for the dummy data byte 932. In another example, a receiving device that expects a quick line turnaround may activate its driver during the seventh clock pulse transmitted on SCLK 922 for the dummy data byte 932.

When the ERWL command frame 928 is addressed to a MID or USID, a receiving device may drive SDATA 924 to the high signaling state to acknowledge successful receipt of the datagram, and may leave SDATA 924 in the low signaling state when an error has been detected in the preceding data. When the ERWL command frame 928 is addressed to a GSID, a receiving device may maintain its SDATA line driver in a high-impedance state when the datagram is successfully received and may drive SDATA 924 to the high signaling state to indicate an error has been detected in the datagram. SDATA 924 may be returned to the low signaling state during the ninth pulse transmitted on SCLK 922 for the dummy data byte 932, where the ninth pulse corresponds to a dummy parity bit. Bus park signaling 938 is then provided by releasing SDATA 924 and causing SDATA line drivers to enter a high-impedance state.

In the second timing diagram 920, the device that wins bus arbitration 906, 926 drives SDATA 924 for the duration of the transaction (Slave-1 944), commencing with the transmission of the ERWL command frame 928 and continuing until the first bus park signaling 938. The winning device may handover control of SDATA 924 by providing the first bus park signaling 938. One or more devices targeted by the ERWL command frame 928 may actively drive SDATA 924 for a period 948 that begins during or after the first bus park signaling 938 and ends with second bus park signaling 942 upon completion of transmission of the dummy data byte 932 when a negative acknowledgement is to be sent.

Certain aspects of this disclosure provide means by which a device that is compliant or compatible with more recently published SPMI protocols and/or specifications can provide feedback in a dummy data byte. A Register-0 write command directed to the receiving slave device may be used to configure the receiving device to handle the dummy data byte for feedback purposes. FIG. 10 illustrates a datagram structure 1000 for a Register-0 Write command in accordance with SPMI protocols. Register-0 Write commands are transmitted in the shortest datagrams defined by SPMI protocols. The datagram structure 1000 commences with transmission of a two-bit sequence start condition (SSC 1002) followed by a four-bit slave address 1004 or other device identifier. The 8-bit command code 1006 is transmitted next. The 8-bit command code 1006 is the only currently-defined command code that has a most significant bit (MSB 1012) set to 1. The command code 1006 is followed by a parity bit 1008 and bus park signaling 1010.

According to certain aspects disclosed herein, the Register-0 Write command in SPMI and RFFE protocols may be adapted to configure slave devices that can support the dummy data byte feedback technique disclosed herein. In one example, the Register-0 1020 may be usable to enable up to four slave devices for dummy data byte feedback. In the illustrated example, each of the four least-significant bits 1022 Register-0 1020 defines status of dummy data byte feedback support. When one of the four least-significant bits 1022 is set to a first logic state, then dummy data byte feedback is enabled, and when set to a second logic state, dummy data byte feedback is disabled.

The response of the transmitting device to dummy data byte feedback may be determined at high level layers. For example, an application may determine an appropriate response. Dummy data byte feedback may be employed when a group identifier is transmitted in a write command. SDATA may be pulled and held to low signaling state when no device is actively driving the line. Any device that wishes to signal a negative acknowledgement may drive SDATA to a high signaling state.

Legacy devices are not be impacted by the dummy data byte feedback signaling since the legacy device can decode the proper number of clocks to monitor the transaction.

Examples of Processing Circuits and Methods

Figure 11:
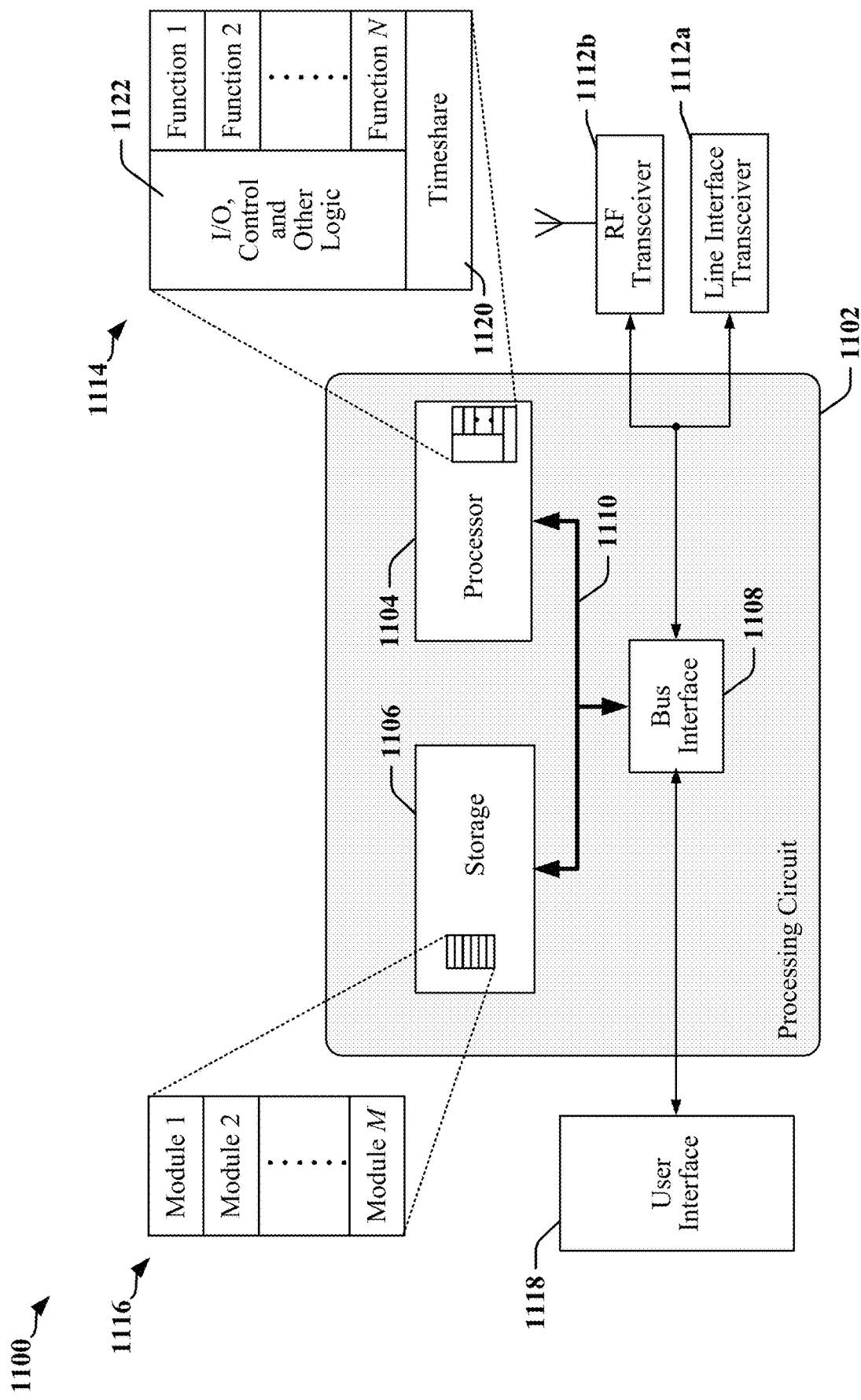
FIG. 11 illustrates one example of an apparatus employing a processing circuit that may be adapted according to certain aspects disclosed herein.

FIG. 11 is a diagram illustrating an example of a hardware implementation for an apparatus 1100. In some examples, the apparatus 1100 may perform one or more functions disclosed herein. In accordance with various aspects of the disclosure, an element, or any portion of an element, or any combination of elements as disclosed herein may be implemented using a processing circuit 1102. The processing circuit 1102 may include one or more processors 1104 that are controlled by some combination of hardware and software modules. Examples of processors 1104 include microprocessors, microcontrollers, digital signal processors (DSPs), SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1104 may include specialized processors that perform specific functions, and that may be configured, augmented or controlled by one of the software modules 1116. The one or more processors 1104 may be configured through a combination of software modules 1116 loaded during initialization, and further configured by loading or unloading one or more software modules 1116 during operation.

In the illustrated example, the processing circuit 1102 may be implemented with a bus architecture, represented generally by the bus 1110. The bus 1110 may include any number of interconnecting buses and bridges depending on the specific application of the processing circuit 1102 and the overall design constraints. The bus 1110 links together various circuits including the one or more processors 1104, and storage 1106. Storage 1106 may include memory devices and mass storage devices, and may be referred to herein as computer-readable media and/or processor-readable media. The bus 1110 may also link various other circuits such as timing sources, timers, peripherals, voltage regulators, and power management circuits. A bus interface 1108 may provide an interface between the bus 1110 and one or more transceivers 1112*a*, 1112*b*. A transceiver 1112*a*, 1112*b* may be provided for each networking technology supported by the processing circuit. In some instances, multiple networking technologies may share some or all of the circuitry or processing modules found in a transceiver 1112*a*, 1112*b*. Each transceiver 1112*a*, 1112*b* provides a means for communicating with various other apparatus over a transmission medium. In one example, a transceiver 1112*a* may be used to couple the apparatus 1100 to a multi-wire bus. In another example, a transceiver 1112*b* may be used to connect the apparatus 1100 to a radio access network. Depending upon the nature of the apparatus 1100, a user interface 1118 (e.g., keypad, display, speaker, microphone, joystick) may also be provided, and may be communicatively coupled to the bus 1110 directly or through the bus interface 1108.

A processor 1104 may be responsible for managing the bus 1110 and for general processing that may include the execution of software stored in a computer-readable medium that may include the storage 1106. In this respect, the processing circuit 1102, including the processor 1104, may be used to implement any of the methods, functions and techniques disclosed herein. The storage 1106 may be used for storing data that is manipulated by the processor 1104 when executing software, and the software may be configured to implement any one of the methods disclosed herein.

One or more processors 1104 in the processing circuit 1102 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1106 or in an external computer-readable medium. The external computer-readable medium and/or storage 1106 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1106 may also include, by way of example, a carrier wave, a transmission line, and any other suitable medium for transmitting software and/or instructions that may be accessed and read by a computer. The computer-readable medium and/or the storage 1106 may reside in the processing circuit 1102, in the processor 1104, external to the processing circuit 1102, or be distributed across multiple entities including the processing circuit 1102. The computer-readable medium and/or storage 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1106 may maintain software maintained and/or organized in loadable code segments, modules, applications, programs, etc., which may be referred to herein as software modules 1116. Each of the software modules 1116 may include instructions and data that, when installed or loaded on the processing circuit 1102 and executed by the one or more processors 1104, contribute to a run-time image 1114 that controls the operation of the one or more processors 1104. When executed, certain instructions may cause the processing circuit 1102 to perform functions in accordance with certain methods, algorithms and processes described herein.

Some of the software modules 1116 may be loaded during initialization of the processing circuit 1102, and these software modules 1116 may configure the processing circuit 1102 to enable performance of the various functions disclosed herein. For example, some software modules 1116 may configure internal devices and/or logic circuits 1122 of the processor 1104, and may manage access to external devices such as a transceiver 1112a, 1112b, the bus interface 1108, the user interface 1118, timers, mathematical coprocessors, and so on. The software modules 1116 may include a control program and/or an operating system that interacts with interrupt handlers and device drivers, and that controls access to various resources provided by the processing circuit 1102. The resources may include memory, processing time, access to a transceiver 1112a, 1112b, the user interface 1118, and so on.

One or more processors 1104 of the processing circuit 1102 may be multifunctional, whereby some of the software modules 1116 are loaded and configured to perform different functions or different instances of the same function. The one or more processors 1104 may additionally be adapted to manage background tasks initiated in response to inputs from the user interface 1118, the transceiver 1112a, 1112b, and device drivers, for example. To support the performance of multiple functions, the one or more processors 1104 may be configured to provide a multitasking environment, whereby each of a plurality of functions is implemented as a set of tasks serviced by the one or more processors 1104 as needed or desired. In one example, the multitasking environment may be implemented using a timesharing program 1120 that passes control of a processor 1104 between different tasks, whereby each task returns control of the one or more processors 1104 to the timesharing program 1120 upon completion of any outstanding operations and/or in response to an input such as an interrupt. When a task has control of the one or more processors 1104, the processing circuit is effectively specialized for the purposes addressed by the function associated with the controlling task. The timesharing program 1120 may include an operating system, a main loop that transfers control on a round-robin basis, a function that allocates control of the one or more processors 1104 in accordance with a prioritization of the functions, and/or an interrupt driven main loop that responds to external events by providing control of the one or more processors 1104 to a handling function.

Figure 12:
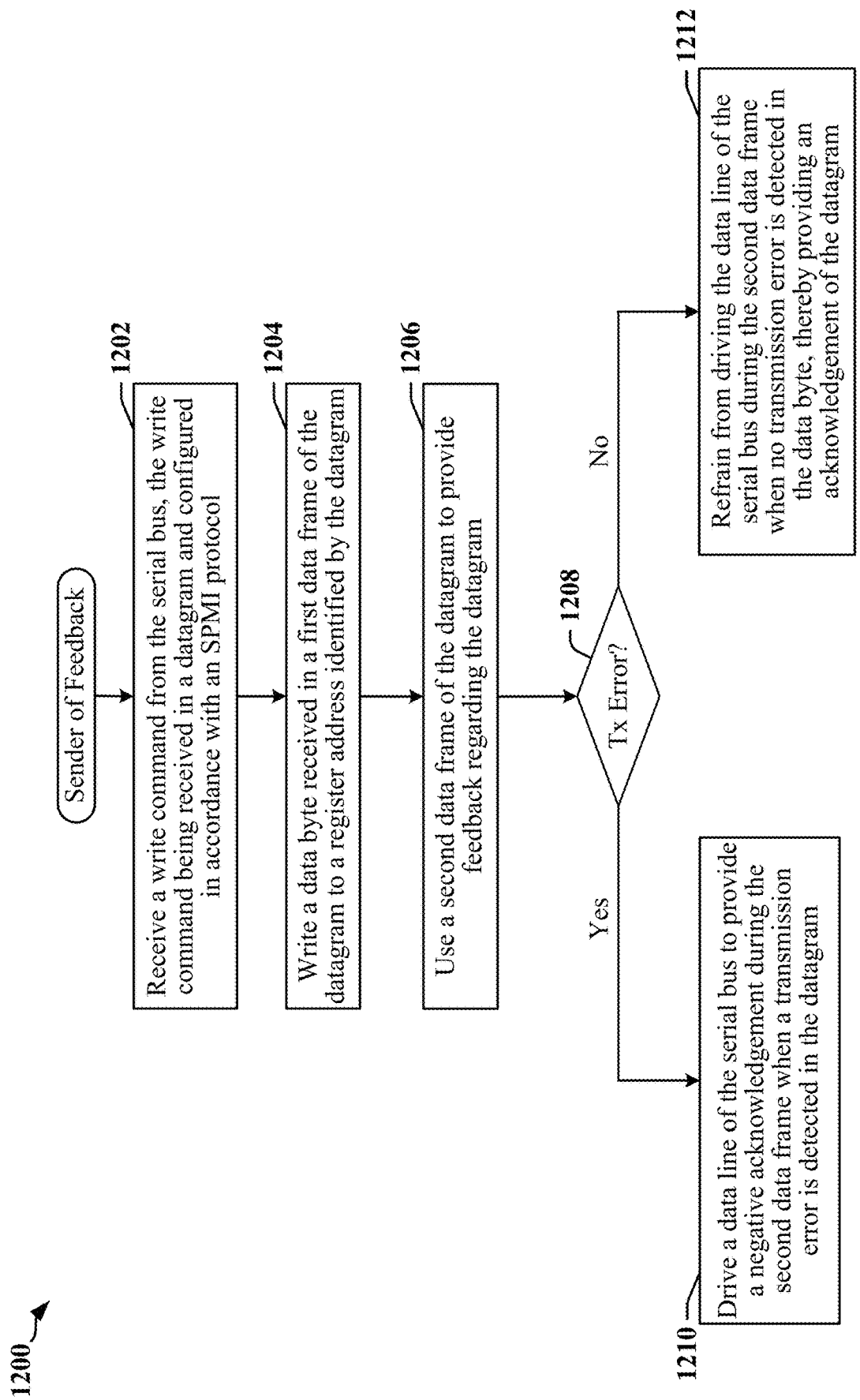
FIG. 12 is a first flowchart that illustrates certain aspects disclosed herein.

FIG. 12 is a flowchart 1200 of a method that may be performed by a device coupled to a serial bus. In one example, the serial bus may be operated in accordance with SPMI specifications. At block 1202, the device may receive a write command from the serial bus. The write command is received in a datagram and configured in accordance with an SPMI protocol. At block 1204, the device may write a data byte received in a first data frame of the datagram to a register address identified by the datagram.

At block 1206, the device may use a second data frame of the datagram to provide feedback regarding the datagram. In certain implementations, the device may determine at block 1208 whether the data byte was received without error. In one example, an error may arise during transmission of the data byte transmitted in the first data frame. In another example, the error may be attributed to one or data bytes transmitted in association with the write command. If an error in the data byte was detected or determined at block 1208, then at block 1210 the device may drive a data line of the serial bus to provide a negative acknowledgement during the second data frame when a transmission error is detected in the datagram. If no error in the data byte was detected or determined at block 1208, then at block 1212 the device may refrain from driving the data line of the serial bus during the second data frame when no transmission error is detected in the datagram, thereby providing an acknowledgement of the datagram. In one example, the second data frame includes nine bit transmission intervals and no data for writing, and may be referred to as a dummy data byte.

In certain examples, the device may enable a line driver coupled to a data line of the serial bus to actively drive the data lane to a high signaling state when providing the negative acknowledgement during the second data frame. In one example, the device may activate the line driver when a seventh pulse is detected on a clock line of the serial bus during the second data frame, and may drive the data line of the serial bus to the high signaling state while an eighth pulse is detected on a clock line of the serial bus during the second data frame. In another example, the device may activate the line driver after the data byte is received in the first data frame of the datagram, and may drive the data line of the serial bus to the high signaling state while an eighth pulse is detected on a clock line of the serial bus during the second data frame.

In certain examples, the device may maintain a line driver coupled to a data line of the serial bus in a high-impedance state during the second data frame when the acknowledgement of the datagram is being provided. The data line may be undriven during the eighth and ninth bit transmission intervals of the second data frame. In one example, the data line is pulled to a low signaling state when the data line is undriven.

In one example, the device may use the second data frame of the datagram to provide feedback when a bit of a configuration byte received from the serial bus is set to a first value and ignore the second data frame of the datagram when the bit of the configuration byte received from the serial bus is set to a second value.

In certain examples, the device may provide a bus park sequence on the serial bus after driving the data line of the serial bus during the second data frame. The device may provide the bus park sequence by causing a line driver coupled to a data line of the serial bus to enter a high impedance state at the end of the second data frame.

Figure 13:
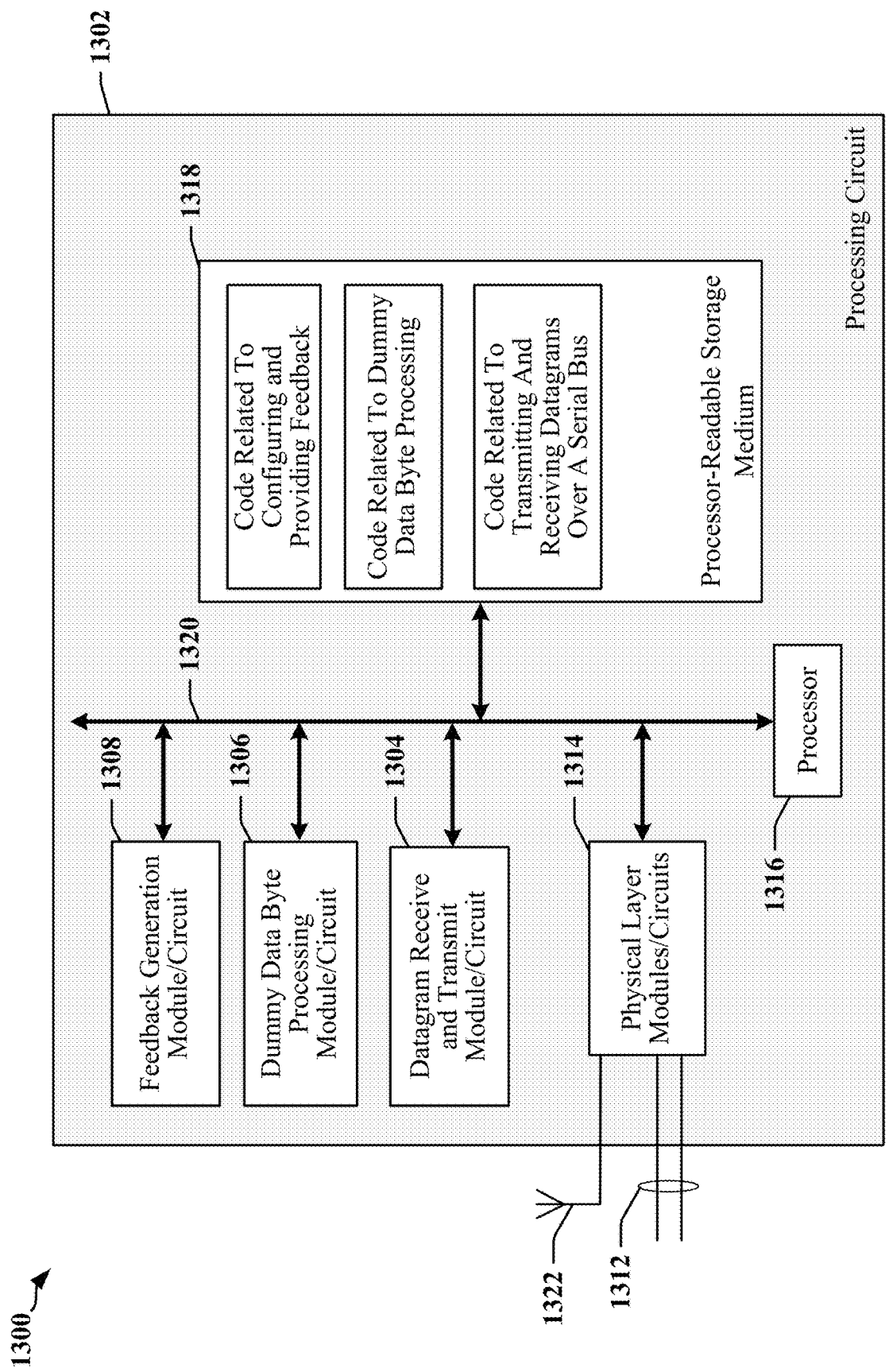
FIG. 13 illustrates a first example of a hardware implementation for an apparatus adapted in accordance with certain aspects disclosed herein.

FIG. 13 is a diagram illustrating a simplified example of a hardware implementation for an apparatus 1300 employing a processing circuit 1302. The processing circuit typically has a controller or processor 1316 that may include one or more microprocessors, microcontrollers, digital signal processors, sequencers and/or state machines. The processing circuit 1302 may be implemented with a bus architecture, represented generally by the bus 1320. The bus 1320 may include any number of interconnecting buses and bridges depending on the specific application of the processing circuit 1302 and the overall design constraints. The bus 1320 links together various circuits including one or more processors and/or hardware modules, represented by the controller or processor 1316, the modules or circuits 1304, 1306 and 1308 and the processor-readable storage medium 1318. One or more physical layer circuits and/or modules 1314 may be provided to support communication over a communication link implemented using a multi-wire bus 1312, through an antenna or antenna array 1322 (to a radio access network for example), and so on. The bus 1320 may also link various other circuits such as timing sources, peripherals, voltage regulators, and power management circuits, which are well known in the art, and therefore, will not be described any further.

The processor 1316 is responsible for general processing, including the execution of software, code and/or instructions stored on the processor-readable storage medium 1318. The processor-readable storage medium 1318 may include a non-transitory storage medium. The software, when executed by the processor 1316, causes the processing circuit 1302 to perform the various functions described supra for any particular apparatus. The processor-readable storage medium 1318 may be used for storing data that is manipulated by the processor 1316 when executing software. The processing circuit 1302 further includes at least one of the modules 1304, 1306 and 1308. The modules 1304, 1306 and 1308 may be software modules running in the processor 1316, resident/stored in the processor-readable storage medium 1318, one or more hardware modules coupled to the processor 1316, or some combination thereof. The modules 1304, 1306 and 1308 may include microcontroller instructions, state machine configuration parameters, or some combination thereof.

In one configuration, the apparatus 1300 includes modules and/or circuits 1308 adapted to detect or determine errors in received data, including a parity bit condition that may indicate that a transmission error occurred. The apparatus 1300 may include modules and/or circuits 1306 adapted to process dummy data bytes, and modules and/or circuits 1304 adapted to configure, conduct and/or participate in transactions over the multi-wire bus 1312 configured to operate according to SPMI specifications or protocols. The dummy data bytes may have been transmitted for feedback purposes.

In certain implementations, the apparatus 1300 includes physical layer circuits and/or modules 1314 that implement an interface circuit adapted to couple the apparatus 1300 to the multi-wire bus 1312. The apparatus 1300 may have a processor 1316 configured to receive a write command from the serial bus where the write command is received in a datagram and configured in accordance with an SPMI protocol, write a data byte received in a first data frame of the datagram to a register address identified by the datagram, and use a second data frame of the datagram to provide feedback regarding the datagram. The processor 1316 may be configured to drive a data line of the serial bus to provide a negative acknowledgement during the second data frame when a transmission error is detected in the datagram, and refrain from driving the data line of the serial bus during the second data frame when no transmission error is detected in the datagram, thereby providing an acknowledgement of the datagram. In one example, the second data frame includes nine bit transmission intervals and no data for writing.

The apparatus 1300 may include a line driver coupled to a data line of the serial bus. In some implementations, the processor 1316 is configured to enable the line driver to actively drive the data lane to a high signaling state when providing the negative acknowledgement during the second data frame. The processor 1316 may be configured to activate the line driver when a seventh pulse is detected on a clock line of the serial bus during the second data frame, and drive the data line of the serial bus to the high signaling state while an eighth pulse is detected on a clock line of the serial bus during the second data frame. In some implementations, the processor 1316 is configured to maintain the line driver in a high-impedance state during the second data frame when the acknowledgement of the datagram is being provided. The data line may be undriven during the eighth and ninth bit transmission intervals of the second data frame. The data line may be pulled to a low signaling state when the data line is undriven.

In some implementations, the processor 1316 is configured to use the second data frame of the datagram to provide feedback when a bit of a configuration byte received from the serial bus is set to a first value, and ignore the second data frame of the datagram when the bit of the configuration byte received from the serial bus is set to a second value.

In some implementations, the processor 1316 is configured to provide a bus park sequence on the serial bus after driving the data line of the serial bus during the second data frame. In some implementations, the processor 1316 is configured to cause the line driver coupled to a data line of the serial bus to enter a high impedance state at the end of the second data frame.

The processor-readable storage medium 1318 may include transitory or non-transitory storage devices configured to store code, instructions and/or parameters used to implement one or more methods or procedures disclosed herein. The processor-readable storage medium 1318 may include code for receiving a write command from the serial bus. The write command may be received in a datagram and configured in accordance with an SPMI protocol. The processor-readable storage medium 1318 may include code for writing a data byte received in a first data frame of the datagram to a register address identified by the datagram. The processor-readable storage medium 1318 may include code for using a second data frame of the datagram to provide feedback regarding the datagram by driving a data line of the serial bus to provide a negative acknowledgement during the second data frame when a transmission error is detected in the datagram and refraining from driving the data line of the serial bus during the second data frame when no transmission error is detected in the datagram, thereby providing an acknowledgement of the datagram.

In one example, the second data frame includes nine bit transmission intervals and no data for writing.

In certain examples, a line driver coupled to a data line of the serial bus may be enabled to actively drive the data lane to a high signaling state when providing the negative acknowledgement during the second data frame. The line driver may be activated when a seventh pulse is detected on a clock line of the serial bus during the second data frame, and the data line of the serial bus may be driven to the high signaling state while an eighth pulse is detected on a clock line of the serial bus during the second data frame.

In certain examples, the processor-readable storage medium 1318 may include code for maintaining a line driver coupled to a data line of the serial bus in a high-impedance state during the second data frame when the acknowledgement of the datagram is being provided. The data line may be undriven during the eighth and ninth bit transmission intervals of the second data frame. In one example, the data line is pulled to a low signaling state when the data line is undriven.

In one example, the processor-readable storage medium 1318 may include code for using the second data frame of the datagram to provide feedback when a bit of a configuration byte received from the serial bus is set to a first value and ignoring the second data frame of the datagram when the bit of the configuration byte received from the serial bus is set to a second value.

In certain examples, the processor-readable storage medium 1318 may include code for providing a bus park sequence on the serial bus after driving the data line of the serial bus during the second data frame. The processor-readable storage medium 1318 may include code for providing the bus park sequence by causing a line driver coupled to a data line of the serial bus to enter a high impedance state at the end of the second data frame.

Figure 14:
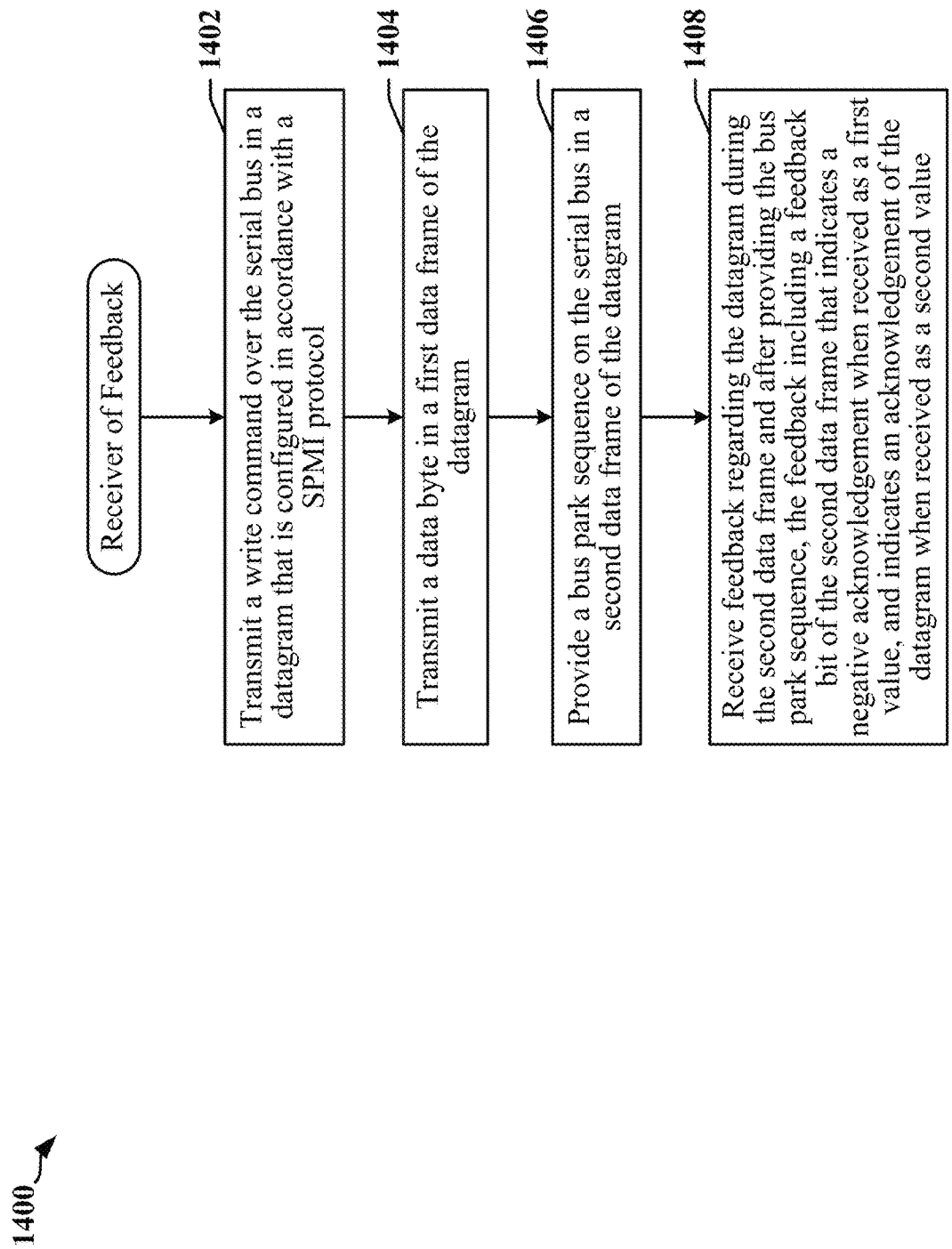
FIG. 14 is a second flowchart that illustrates certain aspects disclosed herein.

FIG. 14 is a flowchart 1400 of a method that may be performed by a device coupled to a serial bus. In one example, the serial bus may be operated in accordance with SPMI specifications. At block 1402, the device may transmit a write command over the serial bus in a datagram that is configured in accordance with an SPMI protocol. At block 1404, the device may transmit a data byte in a first data frame of the datagram. At block 1406, the device may provide a bus park sequence on the serial bus in a second data frame of the datagram. At block 1408, the device may receive feedback regarding the datagram during the second data frame and after providing the bus park sequence. The feedback may include a feedback bit of the second data frame that indicates a negative acknowledgement when received as a first value, and may indicate an acknowledgement of the datagram when received as a second value.

In one example, the device may provide a bus park sequence by causing a line driver coupled to a data line of the serial bus to enter a high impedance state during a first bit transmission interval in the second data frame. In another example, the device may provide a bus park sequence by causing a line driver coupled to a data line of the serial bus to enter a high impedance state during a seventh bit transmission interval in the second data frame. The data line may be pulled to a signaling state that causes the feedback bit of the second data frame to be received as the second value when the data line is undriven during an eighth bit transmission interval in the second data frame.

In some examples, the write command is addressed to a plurality of devices coupled to the serial bus. The device may configure one or more devices, prior to transmitting the write command, to provide feedback in the second data frame. At least one other device may be configured to ignore the second data frame. For example, the device may configure bit settings of a register located at a zero address in the one or more devices.

Figure 15:
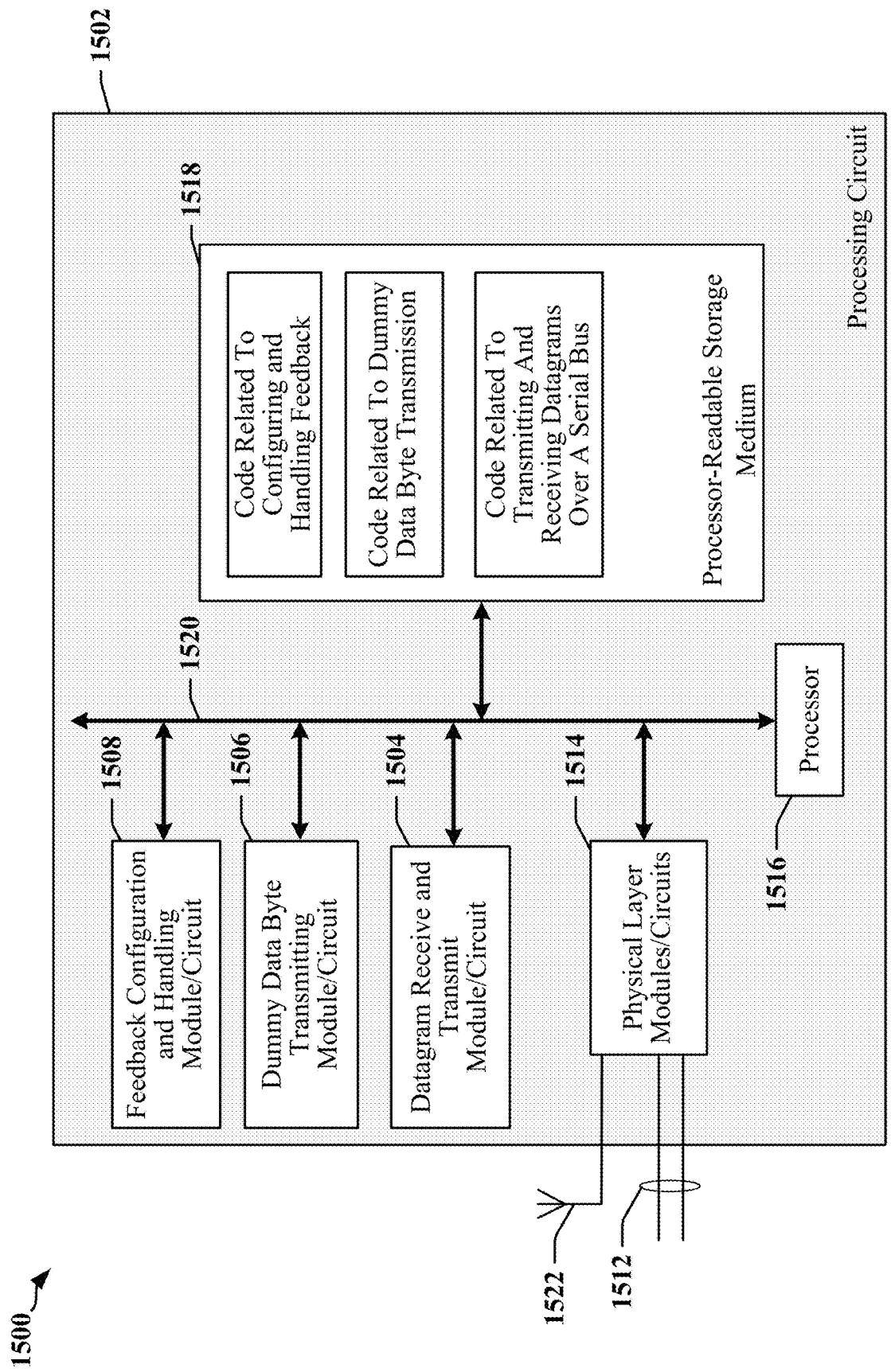
FIG. 15 illustrates a second example of a hardware implementation for an apparatus adapted in accordance with certain aspects disclosed herein.

FIG. 15 is a diagram illustrating a simplified example of a hardware implementation for an apparatus 1500 employing a processing circuit 1502. The processing circuit typically has a controller or processor 1516 that may include one or more microprocessors, microcontrollers, digital signal processors, sequencers and/or state machines. The processing circuit 1502 may be implemented with a bus architecture, represented generally by the bus 1520. The bus 1520 may include any number of interconnecting buses and bridges depending on the specific application of the processing circuit 1502 and the overall design constraints. The bus 1520 links together various circuits including one or more processors and/or hardware modules, represented by the controller or processor 1516, the modules or circuits 1504, 1506 and 1508 and the processor-readable storage medium 1518. One or more physical layer circuits and/or modules 1514 may be provided to support communication over a communication link implemented using a multi-wire bus 1512, through an antenna or antenna array 1522 (to a radio access network for example), and so on. The bus 1520 may also link various other circuits such as timing sources, peripherals, voltage regulators, and power management circuits, which are well known in the art, and therefore, will not be described any further.

The processor 1516 is responsible for general processing, including the execution of software, code and/or instructions stored on the processor-readable storage medium 1518. The processor-readable storage medium 1518 may include a non-transitory storage medium. The software, when executed by the processor 1516, causes the processing circuit 1502 to perform the various functions described supra for any particular apparatus. The processor-readable storage medium 1518 may be used for storing data that is manipulated by the processor 1516 when executing software. The processing circuit 1502 further includes at least one of the modules 1504, 1506 and 1508. The modules 1504, 1506 and 1508 may be software modules running in the processor 1516, resident/stored in the processor-readable storage medium 1518, one or more hardware modules coupled to the processor 1516, or some combination thereof. The modules 1504, 1506 and 1508 may include microcontroller instructions, state machine configuration parameters, or some combination thereof.

In one configuration, the apparatus 1500 includes modules and/or circuits 1508 adapted to configure devices coupled to the serial bus to report feedback on errors in received data, including a parity bit condition that may indicate that a transmission error occurred. The apparatus 1500 may include modules and/or circuits 1506 adapted to transmit dummy data bytes, and modules and/or circuits 1504 adapted to configure, conduct and/or participate in transactions over the multi-wire bus 1512 configured to operate according to SPMI specifications or protocols. The dummy data bytes may be transmitted for feedback purposes.

In certain implementations, the apparatus 1500 includes physical layer circuits and/or modules 1514 that implement an interface circuit adapted to couple the apparatus 1500 to the multi-wire bus 1512. The apparatus 1500 may have a processor 1516 configured to transmit a write command over the serial bus in a datagram that is configured in accordance with an SPMI protocol, transmit a data byte in a first data frame of the datagram, provide a bus park sequence on the serial bus in a second data frame of the datagram, and receive feedback regarding the datagram during the second data frame and after providing the bus park sequence. The feedback may include a feedback bit of the second data frame that indicates a negative acknowledgement when received as a first value, and may indicate an acknowledgement of the datagram when received as a second value.

In some implementations, the processor 1516 is configured to cause a line driver coupled to a data line of the serial bus to enter a high impedance state during a seventh bit transmission interval in the second data frame when providing a bus park sequence. The data line may be pulled to a signaling state that causes the feedback bit of the second data frame to be received as the second value when the data line is undriven during an eighth bit transmission interval in the second data frame.

In some instances, the write command is addressed to a plurality of devices coupled to the serial bus. In some implementations, the processor 1516 configures one or more devices to provide feedback in the second data frame prior to transmitting the write command. At least one other device may be configured to ignore the second data frame.

The processor-readable storage medium 1518 may include transitory or non-transitory storage devices configured to store code, instructions and/or parameters used to implement one or more methods or procedures disclosed herein. The processor-readable storage medium 1518 may include code for transmitting a write command over the serial bus in a datagram that is configured in accordance with an SPMI protocol, transmitting a data byte in a first data frame of the datagram, providing a bus park sequence on the serial bus in a second data frame of the datagram, and receiving feedback regarding the datagram during the second data frame and after providing the bus park sequence. The feedback may include a feedback bit of the second data frame that indicates a negative acknowledgement when received as a first value, and indicates an acknowledgement of the datagram when received as a second value.

The processor-readable storage medium 1518 may include code for causing a line driver coupled to a data line of the serial bus to enter a high impedance state during a seventh bit transmission interval in the second data frame, when providing the bus park sequence. The data line may be pulled to a signaling state that causes the feedback bit of the second data frame to be received as the second value when the data line is undriven during an eighth bit transmission interval in the second data frame.

In some instances, the write command is addressed to a plurality of devices coupled to the serial bus. The processor-readable storage medium 1518 may include code for configuring one or more devices, prior to transmitting the write command, and to provide feedback in the second data frame. At least one other device may be configured to ignore the second data frame.

Some implementation examples are described in the following numbered clauses:

1. A method of data communication at a device coupled to a serial bus, comprising: receiving a write command from the serial bus, the write command being received in a datagram and configured in accordance with a System Power Management Interface (SPMI) protocol; writing a data byte received in a first data frame of the datagram to a register address identified by the datagram; and using a second data frame of the datagram to provide feedback regarding the datagram, including: driving a data line of the serial bus to provide a negative acknowledgement during the second data frame when a transmission error is detected in the datagram; and refraining from driving the data line of the serial bus during the second data frame when no transmission error is detected in the datagram, thereby providing an acknowledgement of the datagram.

2. The method of clause 1, further comprising: enabling a line driver coupled to the data line of the serial bus to actively drive the data line to a high signaling state when providing the negative acknowledgement during the second data frame.

3. The method of clause 2, further comprising: activating the line driver when a seventh pulse is detected on a clock line of the serial bus during the second data frame; and driving the data line of the serial bus to the high signaling state while an eighth pulse is detected on the clock line of the serial bus during the second data frame.

4. The method of clause 2, further comprising: activating the line driver after the data byte is received in the first data frame of the datagram; and driving the data line of the serial bus to the high signaling state while an eighth pulse is detected on a clock line of the serial bus during the second data frame, wherein the data line is in a high-impedance state after the data byte is received in the first data frame of the datagram.

5. The method of clause 1, further comprising: maintaining a line driver coupled to the data line of the serial bus in a high-impedance state during the second data frame when the acknowledgement of the datagram is being provided.

6. The method of clause 5, wherein the data line is undriven during eighth and ninth bit transmission intervals of the second data frame, and wherein the data line is pulled to a low signaling state when the data line is undriven.

7. The method of any of clauses 1-6, further comprising: using the second data frame of the datagram to provide feedback when a bit of a configuration byte received from the serial bus is set to a first value; and ignoring the second data frame of the datagram when the bit of the configuration byte received from the serial bus is set to a second value.

8. The method of any of clauses 1-7, further comprising: providing a bus park sequence on the serial bus after driving the data line of the serial bus during the second data frame.

9. The method of clause 8, wherein providing the bus park sequence comprises: causing a line driver coupled to the data line of the serial bus to enter a high impedance state after completion of the second data frame.

10. An apparatus for data communication comprising: an interface circuit adapted to couple the apparatus to a serial bus; and a processor configured to: receive a write command from the serial bus, the write command being received in a datagram and configured in accordance with a System Power Management Interface (SPMI) protocol; write a data byte received in a first data frame of the datagram to a register address identified by the datagram; and use a second data frame of the datagram to provide feedback regarding the datagram, by driving a data line of the serial bus to provide a negative acknowledgement during the second data frame when a transmission error is detected in the datagram, and refraining from driving the data line of the serial bus during the second data frame when no transmission error is detected in the datagram, thereby providing an acknowledgement of the datagram.

11. The apparatus of clause 10, further comprising: a line driver coupled to the data line of the serial bus, wherein the processor is further configured to: enable the line driver to actively drive the data line to a high signaling state when providing the negative acknowledgement during the second data frame.

12. The apparatus of clause 11, wherein the processor is further configured to: activate the line driver when a seventh pulse is detected on a clock line of the serial bus during the second data frame; and drive the data line of the serial bus to the high signaling state while an eighth pulse is detected on the clock line of the serial bus during the second data frame.

13. The apparatus of clause 11, wherein the processor is further configured to: activate the line driver after the data byte is received in the first data frame of the datagram; and drive the data line of the serial bus to the high signaling state while an eighth pulse is detected on a clock line of the serial bus during the second data frame, wherein the data line is in a high-impedance state after the data byte is received in the first data frame of the datagram.

14. The apparatus of clause 10, further comprising: a line driver coupled to the data line of the serial bus, wherein the processor is further configured to: maintain the line driver in a high-impedance state during the second data frame when the acknowledgement of the datagram is being provided.

15. The apparatus of clause 14, wherein the data line is undriven during eighth and ninth bit transmission intervals of the second data frame, and wherein the data line is pulled to a low signaling state when the data line is undriven.

16. The apparatus of any of clauses 10-15, wherein the processor is further configured to: use the second data frame of the datagram to provide feedback when a bit of a configuration byte received from the serial bus is set to a first value; and ignore the second data frame of the datagram when the bit of the configuration byte received from the serial bus is set to a second value.

17. The apparatus of any of clauses 10-16, further comprising: a line driver coupled to the data line of the serial bus, wherein the processor is further configured to: provide a bus park sequence on the serial bus after driving the data line of the serial bus during the second data frame.

18. The apparatus of clause 17, wherein providing the bus park sequence comprises: causing the line driver coupled to the data line of the serial bus to enter a high impedance state after completion of the second data frame.

19. A method of data communication at a device coupled to a serial bus, comprising: transmitting a write command over the serial bus in a datagram that is configured in accordance with a System Power Management Interface (SPMI) protocol; transmitting a data byte in a first data frame of the datagram; providing a bus park sequence on the serial bus in a second data frame of the datagram; and receiving feedback regarding the datagram during the second data frame, the feedback including a feedback bit of the second data frame that indicates a negative acknowledgement when received as a first value, and indicates an acknowledgement of the datagram when received as a second value.

20. The method of clause 19, wherein providing the bus park sequence comprises: causing a line driver coupled to a data line of the serial bus to enter a high impedance state during a first bit transmission interval in the second data frame, wherein the data line is pulled to a signaling state that causes the feedback bit of the second data frame to be received as the second value during an eighth bit transmission interval in the second data frame.

21. The method of clause 19, wherein providing the bus park sequence comprises: causing a line driver coupled to a data line of the serial bus to enter a high impedance state during a seventh bit transmission interval in the second data frame, wherein the data line is pulled to a signaling state that causes the feedback bit of the second data frame to be received as the second value during an eighth bit transmission interval in the second data frame.

22. The method of any of clauses 19-21, wherein the write command is addressed to a plurality of devices coupled to the serial bus.

23. The method of any of clauses 19-22, further comprising: prior to transmitting the write command, configuring one or more devices to provide the feedback in the second data frame, wherein at least one other device is configured to ignore the second data frame.

24. The method of clause 23, wherein configuring the one or more devices to provide the feedback comprises: configuring bit settings of a register located at a zero address in the one or more devices.

25. An apparatus for data communication comprising: an interface circuit adapted to couple the apparatus to a serial bus; and a processor configured to: transmit a write command over the serial bus in a datagram that is configured in accordance with a System Power Management Interface (SPMI) protocol; transmit a data byte in a first data frame of the datagram; provide a bus park sequence on the serial bus in a second data frame of the datagram; and receive feedback regarding the datagram during the second data frame, the feedback including a feedback bit of the second data frame that indicates a negative acknowledgement when received as a first value, and indicates an acknowledgement of the datagram when received as a second value.

26. The apparatus of clause 25, wherein the processor is further configured to: cause a line driver coupled to a data line of the serial bus to enter a high impedance state during a first bit transmission interval in the second data frame, wherein the data line is pulled to a signaling state that causes the feedback bit of the second data frame to be received as the second value during an eighth bit transmission interval in the second data frame.

27. The apparatus of clause 25, wherein the processor is further configured to: cause a line driver coupled to a data line of the serial bus to enter a high impedance state during a seventh bit transmission interval in the second data frame, wherein the data line is pulled to a signaling state that causes the feedback bit of the second data frame to be received as the second value during an eighth bit transmission interval in the second data frame.

28. The apparatus of any of clauses 25-27, wherein the write command is addressed to a plurality of devices coupled to the serial bus.

29. The apparatus of any of clauses 25-28, wherein the processor is further configured to: configure one or more devices to provide the feedback in the second data frame prior to transmitting the write command, wherein at least one other device is configured to ignore the second data frame.

30. The apparatus of clause 29, wherein the processor is further configured to: configure bit settings of a register located at a zero address in the one or more devices.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of data communication at a device coupled to a serial bus, comprising:
   receiving a write command from the serial bus, the write command being received in a datagram and configured in accordance with a System Power Management Interface (SPMI) protocol;
   writing a data byte received in a first data frame of the datagram to a register address identified by the datagram; and
   using a second data frame of the datagram to provide feedback regarding the datagram, including:
   driving a data line of the serial bus to provide a negative acknowledgement during the second data frame when a transmission error is detected in the datagram, wherein driving the data line to provide the negative acknowledgement includes:
      enabling a line driver coupled to the data line of the serial bus to actively drive the data line to a high signaling state when providing the negative acknowledgement during the second data frame,
      activating the line driver when a seventh pulse is detected on a clock line of the serial bus during the second data frame, and
      driving the data line of the serial bus to the high signaling state while an eighth pulse is detected on the clock line of the serial bus during the second data frame; and
   refraining from driving the data line of the serial bus during the second data frame when no transmission error is detected in the datagram, thereby providing an acknowledgement of the datagram.

2. The method of claim 1, further comprising:
   maintaining the line driver coupled to the data line of the serial bus in a high-impedance state during the second data frame when the acknowledgement of the datagram is being provided.

3. The method of claim 2, wherein the data line is undriven during eighth and ninth bit transmission intervals of the second data frame, and wherein the data line is pulled to a low signaling state when the data line is undriven.

4. The method of claim 1, further comprising:
   using the second data frame of the datagram to provide feedback when a bit of a configuration byte received from the serial bus is set to a first value; and
   ignoring the second data frame of the datagram when the bit of the configuration byte received from the serial bus is set to a second value.

5. The method of claim 1, further comprising:
   providing a bus park sequence on the serial bus after driving the data line of the serial bus during the second data frame.

6. The method of claim 5, wherein providing the bus park sequence comprises:
   causing the line driver coupled to the data line of the serial bus to enter a high impedance state after completion of the second data frame.

7. An apparatus for data communication comprising:
   an interface circuit adapted to couple the apparatus to a serial bus;
   a line driver coupled to a data line of the serial bus;
   a processor configured to:
      receive a write command from the serial bus, the write command being received in a datagram and configured in accordance with a System Power Management Interface (SPMI) protocol;
      write a data byte received in a first data frame of the datagram to a register address identified by the datagram; and
      use a second data frame of the datagram to provide feedback regarding the datagram, by driving the data line of the serial bus to provide a negative acknowledgement during the second data frame when a transmission error is detected in the datagram, and refrain from driving the data line of the serial bus during the second data frame when no transmission error is detected in the datagram, thereby providing an acknowledgement of the datagram, wherein to drive the data line to provide the negative acknowledgment, the processor is configured to:
  enable the line driver to actively drive the data line to a high signaling state when providing the negative acknowledgement during the second data frame,
  activate the line driver when a seventh pulse is detected on a clock line of the serial bus during the second data frame, and
  drive the data line of the serial bus to the high signaling state while an eighth pulse is detected on the clock line of the serial bus during the second data frame.

8. The apparatus of claim 7,
wherein the processor is further configured to:
  maintain the line driver in a high-impedance state during the second data frame when the acknowledgement of the datagram is being provided.

9. The apparatus of claim 8, wherein the data line is undriven during eighth and ninth bit transmission intervals of the second data frame, and wherein the data line is pulled to a low signaling state when the data line is undriven.

10. The apparatus of claim 7, wherein the processor is further configured to:
  use the second data frame of the datagram to provide feedback when a bit of a configuration byte received from the serial bus is set to a first value; and
  ignore the second data frame of the datagram when the bit of the configuration byte received from the serial bus is set to a second value.

11. The apparatus of claim 7,
wherein the processor is further configured to:
  provide a bus park sequence on the serial bus after driving the data line of the serial bus during the second data frame.

12. The apparatus of claim 11, wherein providing the bus park sequence comprises:
  causing the line driver coupled to the data line of the serial bus to enter a high impedance state after completion of the second data frame.

13. A method of data communication at a device coupled to a serial bus, comprising:
  receiving a write command from the serial bus, the write command being received in a datagram and configured in accordance with a System Power Management Interface (SPMI) protocol;
  writing a data byte received in a first data frame of the datagram to a register address identified by the datagram; and
  using a second data frame of the datagram to provide feedback regarding the datagram, including:
    driving a data line of the serial bus to provide a negative acknowledgement during the second data frame when a transmission error is detected in the datagram, wherein driving the data line to provide the negative acknowledgement includes:
      enabling a line driver coupled to the data line of the serial bus to actively drive the data line to a high signaling state when providing the negative acknowledgement during the second data frame,
      activating the line driver after the data byte is received in the first data frame of the datagram; and
      driving the data line of the serial bus to the high signaling state while an eighth pulse is detected on a clock line of the serial bus during the second data frame, wherein the data line is in a high-impedance state after the data byte is received in the first data frame of the datagram; and
    refraining from driving the data line of the serial bus during the second data frame when no transmission error is detected in the datagram, thereby providing an acknowledgement of the datagram.

14. The method of claim 13, further comprising:
  maintaining the line driver coupled to the data line of the serial bus in a high-impedance state during the second data frame when the acknowledgement of the datagram is being provided.

15. The method of claim 14, wherein the data line is undriven during eighth and ninth bit transmission intervals of the second data frame, and wherein the data line is pulled to a low signaling state when the data line is undriven.

16. The method of claim 13, further comprising:
  using the second data frame of the datagram to provide feedback when a bit of a configuration byte received from the serial bus is set to a first value; and
  ignoring the second data frame of the datagram when the bit of the configuration byte received from the serial bus is set to a second value.

17. The method of claim 13, further comprising:
  providing a bus park sequence on the serial bus after driving the data line of the serial bus during the second data frame.

18. The method of claim 17, wherein providing the bus park sequence comprises:
  causing the line driver coupled to the data line of the serial bus to enter a high impedance state after completion of the second data frame.

19. An apparatus for data communication comprising:
  an interface circuit adapted to couple the apparatus to a serial bus;
  a line driver coupled to a data line of the serial bus; and
  a processor configured to:
    receive a write command from the serial bus, the write command being received in a datagram and configured in accordance with a System Power Management Interface (SPMI) protocol;
    write a data byte received in a first data frame of the datagram to a register address identified by the datagram; and
    use a second data frame of the datagram to provide feedback regarding the datagram, by driving the data line of the serial bus to provide a negative acknowledgement during the second data frame when a transmission error is detected in the datagram, and refrain from driving the data line of the serial bus during the second data frame when no transmission error is detected in the datagram, thereby providing an acknowledgement of the datagram,
    wherein to drive the data line to provide the negative acknowledgment, the processor is configured to:
      enable the line driver to actively drive the data line to a high signaling state when providing the negative acknowledgement during the second data frame,
      activate the line driver after the data byte is received in the first data frame of the datagram; and
      drive the data line of the serial bus to the high signaling state while an eighth pulse is detected on a clock line of the serial bus during the second data frame, wherein the data line is in a high-impedance state after the data byte is received in the first data frame of the datagram.

20. The apparatus of claim 19, wherein the processor is further configured to:
   maintain the line driver in a high-impedance state during the second data frame when the acknowledgement of the datagram is being provided.

21. The apparatus of claim 20, wherein the data line is undriven during eighth and ninth bit transmission intervals of the second data frame, and wherein the data line is pulled to a low signaling state when the data line is undriven.

22. The apparatus of claim 19, wherein the processor is further configured to:
   use the second data frame of the datagram to provide feedback when a bit of a configuration byte received from the serial bus is set to a first value; and
   ignore the second data frame of the datagram when the bit of the configuration byte received from the serial bus is set to a second value.

23. The apparatus of claim 19, wherein the processor is further configured to:
   provide a bus park sequence on the serial bus after driving the data line of the serial bus during the second data frame.

24. The apparatus of claim 23, wherein providing the bus park sequence comprises:
   causing the line driver coupled to the data line of the serial bus to enter a high impedance state after completion of the second data frame.

\* \* \* \* \*